(12) United States Patent
Peng et al.

(10) Patent No.: US 12,443,285 B2
(45) Date of Patent: Oct. 14, 2025

(54) HUMAN-MACHINE INTERACTION METHOD AND HUMAN-MACHINE INTERACTION APPARATUS

(71) Applicant: SHENZHEN YINWANG INTELLIGENT TECHNOLOGIES CO., LTD., Shenzhen (CN)

(72) Inventors: Shuaihua Peng, Shanghai (CN); Hao Wu, Shanghai (CN)

(73) Assignee: Shenzhen Yinwang Intelligent Technologies Co., Ltd.

( * ) Notice: Subject to any disclaimer, the term of this patent is extended or adjusted under 35 U.S.C. 154(b) by 1 day.

(21) Appl. No.: 18/345,631

(22) Filed: Jun. 30, 2023

(65) Prior Publication Data
US 2023/0350498 A1 Nov. 2, 2023

Related U.S. Application Data

(63) Continuation of application No. PCT/CN2021/070188, filed on Jan. 4, 2021.

(51) Int. Cl.
*G06F 3/01* (2006.01)
*B60K 35/00* (2024.01)
(Continued)

(52) U.S. Cl.
CPC .............. *G06F 3/017* (2013.01); *B60K 35/00* (2013.01); *B60W 60/00253* (2020.02); *G06F 3/0304* (2013.01); *B60K 35/28* (2024.01); *B60K 35/29* (2024.01); *B60K 2360/176* (2024.01); *B60K 2360/191* (2024.01)

(58) Field of Classification Search
CPC ...... G06F 3/017; G06F 3/0304; G06F 3/0346; G06F 18/22; B60K 35/00; B60K 35/28; B60K 35/29; B60K 2360/176; B60K 2360/191; B60W 60/00253; G06V 40/28
See application file for complete search history.

(56) References Cited

U.S. PATENT DOCUMENTS

| 2013/0069931 A1* | 3/2013 | Wilson | G06V 40/20 345/157 |
| 2017/0136842 A1* | 5/2017 | Anderson | B60K 35/00 |

(Continued)

FOREIGN PATENT DOCUMENTS

| CN | 105313835 A | 2/2016 |
| CN | 111332314 A | 6/2020 |

(Continued)

OTHER PUBLICATIONS

Chang et al. "Eye on You: Fusing gesture data from depth camera and inertial for person identification" (Year: 2018).*

(Continued)

*Primary Examiner* — Cao H Nguyen
(74) *Attorney, Agent, or Firm* — Fish & Richardson P.C.

(57) ABSTRACT

This application provides a human-machine interaction method and the like. In one aspect, gesture action information of the user is detected by using an optical sensor of the object device; motion track information of the mobile terminal is detected by using a motion sensor of the mobile terminal. When the gesture action information matches the terminal motion track information, corresponding first control is executed.

20 Claims, 27 Drawing Sheets

(51) Int. Cl.
    *B60K 35/28*     (2024.01)
    *B60K 35/29*     (2024.01)
    *B60W 60/00*     (2020.01)
    *G06F 3/03*     (2006.01)

(56) References Cited

U.S. PATENT DOCUMENTS

| | | | | |
|---|---|---|---|---|
| 2022/0164035 | A1* | 5/2022 | Katz | G06F 3/0304 |
| 2022/0404949 | A1* | 12/2022 | Berquam | G06F 3/011 |

FOREIGN PATENT DOCUMENTS

| | | |
|---|---|---|
| CN | 111399636 A | 7/2020 |
| CN | 111741167 A | 10/2020 |
| CN | 111913559 A | 11/2020 |
| DE | 102018100335 A1 | 7/2019 |

OTHER PUBLICATIONS

Chang et al., "Eye on You: Fusing Gesture Data from Depth Camera and Inertial Sensors for Person Identification," 2018 IEEE International Conference On Robotics and Automation (ICRA), May 21, 2018, pp. 2021-2026.

Partial Supplementary European Search Report in European Appln No. 21912431.0, dated Jan. 3, 2024, 12 pages.

Aslan et al., "Design and exploration of mid-air authentication gestures," ACM Transactions on Interactive Intelligent Systems (TiiS), Sep. 14, 2016, 6(3):1-22.

Liu et al., "Dynamic-hand-gesture authentication dataset and benchmark," IEEE Transactions on Information Forensics and Security, Nov. 5, 2020, 16:1550-62.

Extended European Search Report in European Appln No. 21912431.0, dated Mar. 15, 2024, 16 pages.

Zhang, "Vision-based markerless gesture recognition," Changchun Jilin University Press, Jun. 2016, 4 pages (with English abstract).

Xu et al., "Network Security and Virus Prevention (Sixth Edition)," Shanghai Jiao Tong University Press, 21st edition, Jul. 1, 2016, 5 pages (with English abstract).

International Search Report and Written Opinion in International Appln. No. PCT/CN2021/070188, mailed on Oct. 13, 2021, 15 pages (with English translation).

* cited by examiner

HUMAN-MACHINE INTERACTION METHOD AND HUMAN-MACHINE INTERACTION APPARATUS

CROSS-REFERENCE TO RELATED APPLICATIONS

This application is a continuation of International Application No. PCT/CN2021/070188, filed on Jan. 4, 2021, the disclosure of which is hereby incorporated by reference in its entirety.

TECHNICAL FIELD

This application relates to a human-machine interaction method and a human-machine interaction apparatus.

BACKGROUND

In the conventional technology, there is a technology in which a user performs human-machine interaction with an object device by using air operations such as a gesture action. For example, the user interacts with a vehicle as the object device by using a gesture action outside the vehicle, to control the vehicle to start in advance, direct the vehicle to reverse park, or the like.

In this case, to avoid unauthenticated control, validity of the gesture action or validity of a user identity needs to be authenticated. Specifically, for example, when a valid user performs a gesture action, it is possible that there is another person (an invalid user) next to the valid user, and the another person also performs a gesture action at roughly the same time. In this case, it is difficult for the object device to determine which gesture action is valid or which user is a valid user. Consequently, effective human-machine interaction cannot be implemented. Therefore, there is an urgent need for a technology that can implement effective human-machine interaction.

SUMMARY

In view of this, an objective of this application is to provide a technology that can implement effective human-machine interaction.

To achieve the foregoing objective, according to a first aspect of this application, a human-machine interaction method is provided, including: obtaining motion track information of a mobile terminal, where the motion track information is obtained by using a motion sensor of the mobile terminal; obtaining first gesture action information of a user, where the first gesture action information is obtained by using an optical sensor of an object device that interacts with the user; and executing first control when the first gesture action information matches the motion track information, where the first control includes control executed according to a control instruction corresponding to the first gesture action information.

By using the foregoing human-machine interaction method, when the user interacts with the object device, the user performs a gesture action by using a hand (or an arm) holding the mobile terminal. In this case, in one aspect, gesture action information (namely, the first gesture action information) of the user is detected by using the optical sensor; and in another aspect, motion track information of the mobile terminal moving along with the hand of the user, namely, terminal motion track information, is detected by using the motion sensor of the mobile terminal. When the first gesture action information matches the terminal motion track information, the corresponding first control is executed.

Because the mobile terminal moves along with the hand of the user, there is an exclusive correspondence between the motion track information of the mobile terminal and the gesture action information of the hand of the user. Therefore, execution of control based on a gesture action of an invalid user can be avoided by executing the first control when the gesture action information matches the terminal track information, so that effective human-machine interaction can be implemented.

In addition, in a method different from that in this application, it can be considered to use a facial recognition technology to authenticate validity of a gesture action or validity of a user identity. However, there are some problems in the facial recognition technology. For example, sometimes the user does not want to perform facial recognition for reasons such as privacy protection, or sometimes the user is far away from the object device (for example, the user operates a vehicle over a distance of tens of meters away). As a result, precision and reliability of facial recognition are reduced, and authentication cannot be effectively implemented.

However, by using the foregoing human-machine interaction method according to the first aspect of this application, the first control is executed on a condition that the gesture action information matches the terminal motion track information, so that execution of control based on the gesture action of the invalid user can be avoided. Even if facial recognition is not performed, effective human-machine interaction can be implemented, and problems such as privacy infringement caused by facial recognition can be avoided.

In addition, that "even if facial recognition is not performed" herein means that the technology in this application is different from the facial recognition technology, but does not mean that the technology in this application excludes the facial recognition technology. In an appropriate case, the technology in this application may be used in combination with the facial recognition technology.

In a possible implementation of the first aspect of this application, the first gesture action information includes gesture action form information and gesture action time information, the motion track information includes motion track form information and motion track time information, and the method further includes: determining, based on a similarity between the gesture action form information and the motion track form information and consistency between the gesture action time information and the motion track time information, whether the first gesture action information matches the motion track information.

By adopting the foregoing human-machine interaction method, the determining whether the first gesture action information matches the motion track information is performed not only based on the similarity between the gesture action form information and the motion track form information, but also based on the consistency between the gesture action time information and the motion track time information. Therefore, a gesture action that matches a track of the mobile terminal can be reliably identified, to further avoid interference of the gesture action of the invalid user.

By using the foregoing human-machine interaction method, whether a gesture action is valid can be determined based on whether the first gesture action information matches the motion track information, to determine whether a control instruction corresponding to the gesture action is executed. Therefore, wrong control can be reliably avoided.

In a possible implementation of the first aspect of this application, the method further includes: recognizing, by using the optical sensor, the user corresponding to the first gesture action information; and when the first gesture action information matches the motion track information, authenticating the user corresponding to the first gesture action information as a valid user.

In this case, second gesture action information of the valid user may be obtained by using the optical sensor, where the second gesture action information is later than the first gesture action information in terms of time, and the first control includes control executed according to a control instruction corresponding to the second gesture action information.

By using the foregoing human-machine interaction method, after the user is authenticated as a valid user, a subsequent gesture action (a second gesture action) performed by the user is also considered as valid, and it is not necessary to compare whether the second gesture action matches a terminal motion track. Therefore, the user no longer needs to perform a gesture action by using the hand holding a mobile phone. This reduces the operation burden of the user.

In a possible implementation of the first aspect of this application, the object device is a vehicle, the vehicle has a display, and the first control may be displaying, on the display, an environment image including the valid user, where the valid user is highlighted in the environment image.

By using the foregoing human-machine interaction method, the valid user is highlighted on the display of the vehicle, and the driver can be prompted to quickly find the user.

In a possible implementation of the first aspect of this application, the object device is a vehicle, and the first control includes enabling the vehicle to move autonomously toward the valid user.

In a possible implementation of the first aspect of this application, the obtaining first gesture action information is performed on a condition that a predefined operation is performed on the mobile terminal.

By using the foregoing human-machine interaction method, a function of obtaining a gesture action is activated on the condition that the predefined operation is performed on the mobile terminal. This can suppress activation that is of the function of obtaining a gesture action and that is against an intention of the user, and reduce power consumption.

In a possible implementation of the first aspect of this application, the obtaining first gesture action information includes: obtaining location information of the mobile terminal from the mobile terminal; and adjusting the optical sensor based on the location information, so that the mobile terminal is within a detection range of the optical sensor.

In this way, the optical sensor is adjusted based on the location information of the mobile terminal, and therefore, that the user and the gesture action of the user are detected can be ensured.

In a possible implementation of the first aspect of this application, the obtaining first gesture action information includes: when the motion track information is obtained but the gesture action information is not obtained within predefined time, sending, to the mobile terminal, information for requesting to perform a first gesture action.

In this way, for example, because the user stands in a hidden position or is blocked, recognition performed by the optical sensor on the gesture action of the user fails. In this case, the user may be prompted to perform a gesture action again.

In a possible implementation of the first aspect of this application, the method further includes: authenticating validity of an ID of the mobile terminal, where the obtaining motion track information of a mobile terminal includes obtaining motion track information of a mobile terminal that has a valid ID.

In this way, unauthenticated control can be avoided more reliably.

In addition, to achieve the foregoing objective, a second aspect of this application relates to a human-machine interaction apparatus. The human-machine interaction apparatus is applied to an object device that interacts with a user, and includes: a terminal track obtaining module, configured to obtain motion track information of a mobile terminal, where the motion track information is obtained by using a motion sensor of the mobile terminal; a gesture action obtaining module, configured to obtain first gesture action information of the user, where the first gesture action information is obtained by using an optical sensor of the object device; and a control execution module, configured to execute first control when the first gesture action information matches the motion track information, where the first control includes control executed according to a control instruction corresponding to a first gesture action.

By using the foregoing human-machine interaction apparatus, when the user interacts with the object device, the user performs a gesture action by using a hand (or an arm) holding the mobile terminal. In this case, in one aspect, gesture action information (namely, the first gesture action information) of the user is detected by using the optical sensor; and in another aspect, motion track information of the mobile terminal moving along with the hand of the user, namely, terminal motion track information, is detected by using the motion sensor of the mobile terminal. Then, the first gesture action information is compared with the terminal motion track information, to determine whether the two are matched. When it is determined that the two are matched, the corresponding first control is executed. The first control includes control executed according to the control instruction corresponding to the first gesture action.

Because the mobile terminal moves along with the hand of the user, there is an exclusive correspondence between the motion track information of the mobile terminal and the gesture action information of the hand of the user. Therefore, whether the gesture action is valid can be reliably determined by determining whether the gesture action information matches the terminal track information, to avoid interference of a gesture action of an invalid user, so that effective human-machine interaction can be implemented.

Therefore, by using the foregoing human-machine interaction apparatus, even if facial recognition is not performed, effective human-machine interaction can be implemented, and problems such as privacy infringement caused by facial recognition can be avoided.

In a possible implementation of the second aspect of this application, the first gesture action information includes gesture action form information and gesture action time information, the motion track information includes motion track form information and motion track time information, and the human-machine interaction apparatus further includes a gesture matching module, configured to determine, based on a similarity between the gesture action form information and the motion track form information and consistency between the gesture action time information and the motion track time information, whether the first gesture action information matches the motion track information.

In a possible implementation of the second aspect of this application, the gesture action obtaining module includes a user recognition unit, and the user recognition unit recognizes, by using the optical sensor, the user corresponding to the first gesture action information; and the human-machine interaction apparatus further includes a user authentication module, and the authentication module is configured to: when the first gesture action information matches the motion track information, authenticate the user corresponding to the first gesture action information as a valid user.

In a possible implementation of the second aspect of this application, the gesture action obtaining module obtains second gesture action information of the valid user by using the optical sensor, where the second gesture action information is later than the first gesture action information in terms of time, and the first control includes control executed according to a control instruction corresponding to the second gesture action information.

In a possible implementation of the second aspect of this application, the object device is a vehicle, the vehicle has a display, and the first control includes displaying, on the display, an environment image including the valid user, where the valid user is highlighted in the environment image.

In a possible implementation of the second aspect of this application, the object device is a vehicle, and the first control includes enabling the vehicle to move autonomously toward the valid user.

In a possible implementation of the second aspect of this application, the obtaining first gesture action information is performed on a condition that a predefined operation is performed on the mobile terminal.

In a possible implementation of the second aspect of this application, the human-machine interaction apparatus further includes: a terminal location obtaining unit, configured to obtain location information of the mobile terminal from the mobile terminal; and an optical sensor actuation control unit, configured to adjust the optical sensor based on the location information, so that the mobile terminal is within a detection range of the optical sensor.

In a possible implementation of the second aspect of this application, when the motion track information is obtained but the gesture action information is not obtained within predefined time, information for requesting to perform the first gesture action is sent to the mobile terminal.

In a possible implementation of the second aspect of this application, the human-machine interaction apparatus further includes a terminal ID authentication module, configured to authenticate validity of an ID of the mobile terminal, where the terminal track obtaining module is configured to obtain motion track information of a mobile terminal that has a valid ID.

In addition, to achieve the foregoing objective, a third aspect of this application relates to a vehicle control method. A vehicle has an optical sensor. The method includes: obtaining motion track information of a mobile terminal, where the motion track information is obtained by using a motion sensor of the mobile terminal; obtaining first gesture action information of a user, where the first gesture action information is obtained by using the optical sensor; and executing first control when the first gesture action information matches the motion track information, where the first control includes control executed according to a control instruction corresponding to the first gesture action information.

By using the foregoing vehicle control method, when the user interacts with the vehicle, the user performs a gesture action by using a hand (or an arm) holding the mobile terminal. In this case, in one aspect, gesture action information (namely, the first gesture action information) of the user is detected by using the optical sensor of the vehicle; and in another aspect, motion track information of the mobile terminal moving along with the hand of the user, namely, terminal motion track information, is detected by using the motion sensor of the mobile terminal. Then, the first gesture action information is compared with the terminal motion track information, to determine whether the two are matched. When it is determined that the two are matched, the corresponding first control is executed.

Because the mobile terminal moves along with the hand of the user, there is an exclusive correspondence between the motion track information of the mobile terminal and the gesture action information of the hand of the user. Therefore, whether the gesture action is valid can be reliably determined by determining whether the gesture action information matches the terminal track information, to avoid interference of a gesture action of an invalid user, so that effective human-machine interaction can be implemented.

Therefore, by using the foregoing human-machine interaction method, even if facial recognition is not performed, effective human-machine interaction can be implemented, and problems such as privacy infringement caused by facial recognition can be avoided.

In a possible implementation of the third aspect of this application, the first gesture action information includes gesture action form information and gesture action time information, the motion track information includes motion track form information and motion track time information, and the method further includes: determining, based on a similarity between the gesture action form information and the motion track form information and consistency between the gesture action time information and the motion track time information, that the first gesture action information matches the motion track information.

In a possible implementation of the third aspect of this application, the method further includes: recognizing, by using the optical sensor, the user corresponding to the first gesture action information, and when it is determined that the first gesture action information matches the motion track information, authenticating the user corresponding to the first gesture action information as a valid user.

In a possible implementation of the third aspect of this application, the method further includes: obtaining second gesture action information of the valid user by using the optical sensor, where the second gesture action information is later than the first gesture action information in terms of time, and the first control includes control executed according to a control instruction corresponding to the second gesture action information.

In a possible implementation of the third aspect of this application, the vehicle has a display, and the first control includes displaying, on the display, an environment image including the valid user, where the valid user is highlighted in the environment image.

In a possible implementation of the third aspect of this application, the first control includes enabling the vehicle to move autonomously toward the valid user.

In a possible implementation of the third aspect of this application, the obtaining first gesture action information is performed on a condition that a predefined operation is performed on the mobile terminal.

In a possible implementation of the third aspect of this application, the obtaining first gesture action information includes: The vehicle obtains location information of the mobile terminal from the mobile terminal; and the vehicle adjusts the optical sensor based on the location information, so that the mobile terminal is within a detection range of the optical sensor.

In a possible implementation of the third aspect of this application, the obtaining first gesture action information includes: when the motion track information is obtained but the gesture action information is not obtained within predefined time, sending, to the mobile terminal, information for requesting to perform a first gesture action.

In a possible implementation of the third aspect of this application, the method further includes: authenticating validity of an ID of the mobile terminal, where the obtaining motion track information of a mobile terminal includes obtaining motion track information of a mobile terminal that has a valid ID.

In addition, to achieve the foregoing objective, according to a fourth aspect of this application, a vehicle control apparatus is provided. A vehicle has an optical sensor. The apparatus includes: a terminal track obtaining module, configured to obtain motion track information of a mobile terminal, where the motion track information is obtained by using a motion sensor of the mobile terminal; a gesture action obtaining module, configured to obtain gesture action information of a user, namely, first gesture action information obtained by using the optical sensor; and a control execution module, configured to execute first control when the first gesture action information matches the motion track information, where the first control includes control executed according to a control instruction corresponding to a first gesture action.

By using the foregoing vehicle control apparatus, when the user interacts with the vehicle, the user performs a gesture action by using a hand (or an arm) holding the mobile terminal. In this case, in one aspect, the gesture action information (namely, the first gesture action information) of the user is detected by using the optical sensor like a camera, a millimeter wave radar, and a laser radar of the vehicle; and in another aspect, motion track information of the mobile terminal moving along with the hand of the user, namely, terminal motion track information, is detected by using the motion sensor of the mobile terminal. Then, the first gesture action information is compared with the terminal motion track information, to determine whether the two are matched. When it is determined that the two are matched, the corresponding first control is executed.

Because the mobile terminal moves along with the hand of the user, there is an exclusive correspondence between the motion track information of the mobile terminal and the gesture action information of the hand of the user. Therefore, whether the gesture action is valid can be reliably determined by determining whether the gesture action information matches the terminal track information, to avoid interference of a gesture action of an invalid user, so that effective human-machine interaction can be implemented.

Therefore, by using the foregoing vehicle control apparatus, even if facial recognition is not performed, effective human-machine interaction can be implemented, and problems such as privacy infringement caused by facial recognition can be avoided.

In a possible implementation of the fourth aspect of this application, the first gesture action information includes gesture action form information and gesture action time information, the motion track information includes motion track form information and motion track time information, and the apparatus further includes a gesture matching module that determines, based on a similarity between the gesture action form information and the motion track form information and consistency between the gesture action time information and the motion track time information, whether the first gesture action information matches the motion track information.

In a possible implementation of the fourth aspect of this application, the gesture action obtaining module includes a user recognition unit, and the user recognition unit recognizes, by using the optical sensor, the user corresponding to the first gesture action information. The vehicle control apparatus further includes a user authentication module. When the gesture matching module determines that the first gesture action information matches the motion track information, the authentication module authenticates the user corresponding to the first gesture action information as a valid user.

In a possible implementation of the fourth aspect of this application, the gesture action obtaining module obtains second gesture action information of the valid user by using the optical sensor, where the second gesture action information is later than the first gesture action information in terms of time, and the first control includes control executed according to a control instruction corresponding to the second gesture action information.

In a possible implementation of the fourth aspect of this application, the vehicle has a display, and the first control includes displaying, on the display, an environment image including the valid user, where the valid user is highlighted in the environment image.

In a possible implementation of the fourth aspect of this application, the first control includes enabling the vehicle to move autonomously toward the valid user.

In a possible implementation of the fourth aspect of this application, the obtaining first gesture action information is performed on a condition that a predefined operation is performed on the mobile terminal.

In a possible implementation of the fourth aspect of this application, the apparatus further includes: a terminal location obtaining unit, configured to obtain location information of the mobile terminal from the mobile terminal; and an optical sensor actuation control unit, configured to adjust the optical sensor based on the location information, so that the mobile terminal is within a detection range of the optical sensor.

In a possible implementation of the fourth aspect of this application, when the motion track information is obtained but the gesture action information is not obtained within predefined time, information for requesting to perform the first gesture action is sent to the mobile terminal.

In a possible implementation of the fourth aspect of this application, the apparatus further includes a terminal ID authentication module, configured to authenticate validity of an ID of the mobile terminal, where the terminal track obtaining module is configured to obtain motion track information of a mobile terminal that has a valid ID.

In addition, according to a fifth aspect of this application, a human-machine interaction apparatus is provided, including a processor and a memory, where the memory stores program instructions, and when the program instructions are executed by the processor, the processor is enabled to perform the method according to any implementation of the first aspect.

According to a sixth aspect of this application, a computer-readable storage medium is provided, where the computer-readable storage medium stores program instructions, and when the program instructions are executed by a computer, the computer is enabled to perform the method according to any implementation of the first aspect.

According to a seventh aspect of this application, a computer program is provided. When the computer program is executed by a computer, the computer is enabled to perform the method according to any implementation of the first aspect.

According to an eighth aspect of this application, a vehicle control apparatus is provided, including a processor and a memory, where the memory stores program instructions, and when the program instructions are executed by the processor, the processor is enabled to perform the method according to any implementation of the third aspect.

According to a ninth aspect of this application, a computer-readable storage medium is provided, where the computer-readable storage medium stores program instructions, and when the program instructions are executed by a computer, the computer is enabled to perform the method according to any implementation of the third aspect.

According to a tenth aspect of this application, a computer program is provided. When the computer program is executed by a computer, the computer is enabled to perform the method according to any implementation of the third aspect.

According to the technical solutions of this application, when the user interacts with the object device like the vehicle, the user performs the gesture action by holding the hand (or the arm) of the mobile terminal. In this case, in one aspect, the gesture action information (namely, the first gesture action information) of the user is detected by using the optical sensor of the object device; and in another aspect, the motion track information of the mobile terminal moving along with the hand of the user, namely, the terminal motion track information, is detected by using the motion sensor of the mobile terminal. Then, the first gesture action information is compared with the terminal motion track information, to determine whether the two are matched. When it is determined that the two are matched, the corresponding first control is executed.

Because the mobile terminal moves along with the hand of the user, there is an exclusive correspondence between the motion track information of the mobile terminal and the gesture action information of the hand of the user. Therefore, whether the gesture action is valid can be reliably determined by determining whether the gesture action information matches the terminal track information, to avoid interference of a gesture action of an invalid user, so that effective human-machine interaction can be implemented.

Therefore, by using the technical solutions of this application, even if facial recognition is not performed, effective human-machine interaction can be implemented, and problems such as privacy infringement caused by facial recognition can be avoided.

BRIEF DESCRIPTION OF DRAWINGS

FIG. 5A-1 and FIG. 5A-2 are a processing flowchart on a vehicle side according to an embodiment of this application;

DESCRIPTION OF EMBODIMENTS

Figure 1:
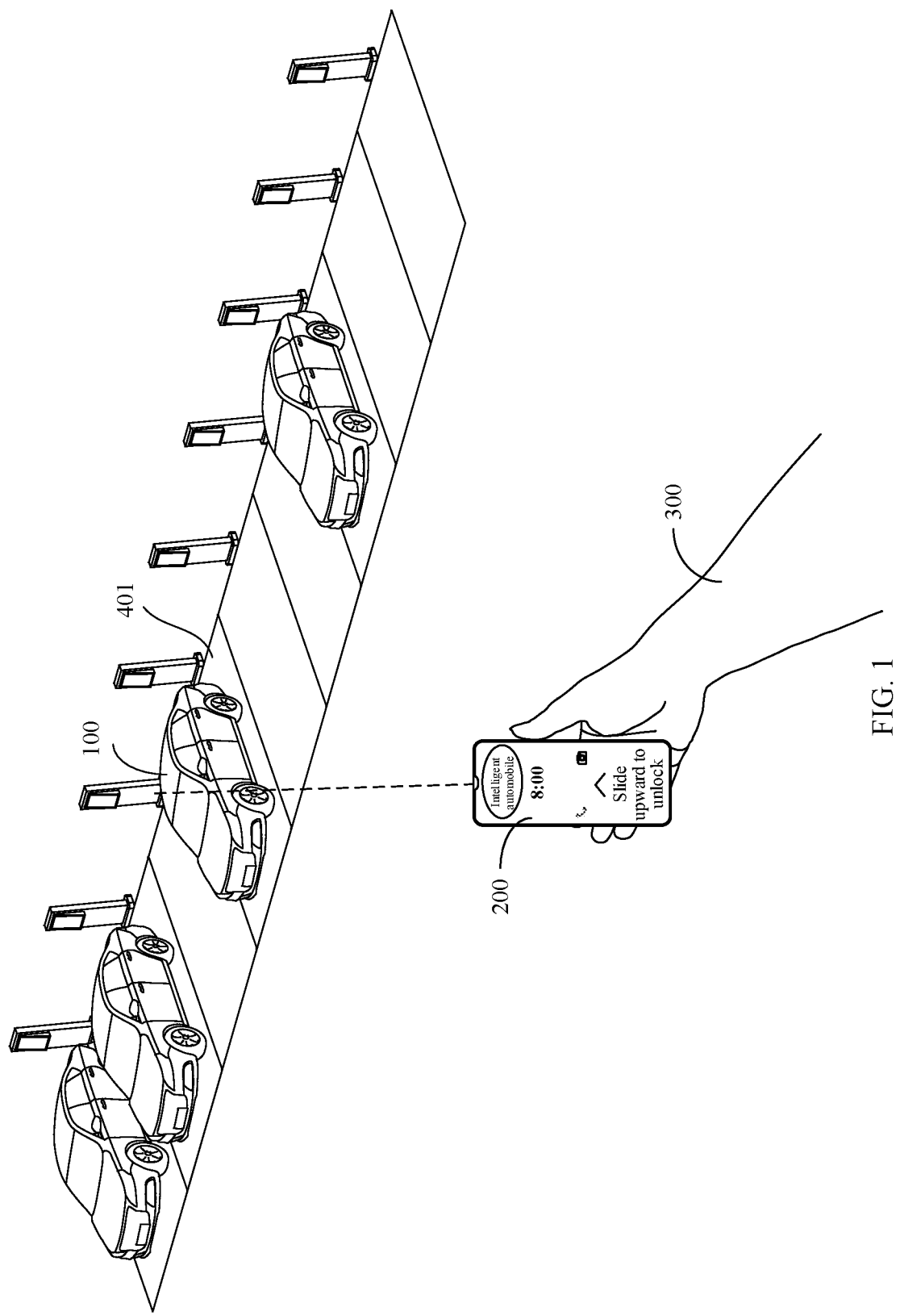
FIG. 1 is an explanatory diagram of a vehicle air control scenario according to an embodiment of this application.

The following describes technical solutions in embodiments of this application.

In the following description, expression manners such as "first" and "second" are intended to distinguish between objects of the same type, but do not distinguish importance and do not indicate a sequence.

Embodiments of this application provide a human-machine interaction technology, to implement interaction between a user (namely, the "human" in human-machine interaction) and an object device (namely, the "machine" in human-machine interaction). To perform effective interaction, the user needs to hold a mobile terminal, and enable the mobile terminal to establish a communication connection to the object device, or enable both the mobile terminal and the object device to establish a communication connection to a common third-party device (for example, a server); and then the user performs a gesture action by using a hand (or an arm) holding the mobile terminal. In this case, in one aspect, the mobile terminal detects a motion track of the mobile terminal moving along with the hand of the user; and in another aspect, for example, an optical sensor (for example, a camera, a millimeter wave radar, or a laser radar) provided by the object device detects the gesture action of the user. Then, motion track information of the mobile terminal is compared with gesture action information of the user, to determine whether the two are matched. When it is determined that the two are matched, corresponding control (referred to as first control) is executed.

In such a human-machine interaction technology, that the gesture action is "valid" is determined essentially on a condition that the gesture action matches the motion track of the mobile terminal. Because the mobile terminal moves along with the hand of the user, there is an exclusive correspondence between the motion track information of the mobile terminal and the gesture action information of the hand of the user. Therefore, whether the gesture action is valid can be reliably determined by determining whether the gesture action information matches the terminal track information, to avoid interference of a gesture action of unrelated personnel, so that effective human-computer interaction can be implemented.

The object device that interacts with a person may be a vehicle, a robot, a smart television, or the like. The mobile terminal may be a smartphone, a wearable device, an electronic car key, a remote controller, or the like. For example, "an object device makes a corresponding response" may be executing a control instruction represented by a gesture action. That a "user" in an image is authenticated as a valid user may be performed during image recognition. In this case, when the object device is a mobile object like a vehicle or a mobile robot, for example, the vehicle or the mobile robot may be controlled to move toward the user based on an image recognition result.

In addition, herein, the "holding the mobile terminal" means that the mobile terminal moves along with the hand of the user, and does not mean to limit a form of a finger when the mobile terminal is held.

Furthermore, to implement the foregoing human-machine interaction technology, as described in detail below, embodiments of this application provide a human-machine interaction method, a human-machine interaction apparatus, a vehicle control method, a vehicle control apparatus, a vehicle, a mobile terminal control method, a mobile terminal control apparatus, a mobile terminal, a server, a computing device, a computer-readable storage medium, a computer program, and the like.

The following describes in detail a plurality of embodiments of this application with reference to the accompanying drawings.

Embodiment 1

This embodiment relates to a method for performing air control on a vehicle by using a gesture action.

First, an interaction scenario in this embodiment is briefly described with reference to FIG. 1.

As shown in FIG. 1, in this embodiment, during human-machine interaction, an example of a person is a user 300, an example of an object device is a vehicle 100, and an example of a mobile terminal is a smartphone 200. Specifically, the vehicle 100 is parked in a parking space 601 of a parking lot, and the user 300 intends to perform air control on the vehicle 100 by using a gesture action. In this case, the user 300 holds the smartphone 200 and enters a Bluetooth or UWB signal range of the vehicle 100, a Bluetooth connection or a UWB connection between the smartphone 200 and the vehicle 100 is initiated, and after the vehicle 100 successfully authenticates an ID (Identification, identity) of the smartphone 200, the connection between the smartphone 200 and the vehicle 100 is established. Then, the user 300 performs a predefined operation on the smartphone 200, where the predefined operation indicates that the user 300 intends to enable the vehicle 100 to activate an air control function. The smartphone 200 sends, to the vehicle 100, an instruction requesting the vehicle 100 to activate the air control function and terminal location information indicating a location of the smartphone.

After receiving the instruction sent by the smartphone 200, the vehicle 100 activates a rotatable camera (not shown in FIG. 1), and turns the camera to a direction of the location of the smartphone 200, so that the smartphone 200 is within a detection range of the camera. In this case, a preparation action for a gesture recognition function is completed. In addition, the vehicle 100 sends, to the smartphone 200, information indicating that "the vehicle-mounted camera turns to the direction of the location of the smartphone 200 and/or gesture recognition is activated". When receiving the information, the smartphone 200 displays prompt information on a display to notify the user 300 that the camera of the vehicle 100 has turned to the direction of the location of the smartphone and/or the gesture recognition function of the vehicle 100 is activated.

After viewing the prompt information, the user 300 performs a predefined gesture action by using a hand (or an arm) holding the smartphone 200, where the predefined gesture action corresponds to a corresponding control instruction. In addition, a correspondence between the predefined gesture action and the control instruction is known to the user 300 in advance.

In this case, in one aspect, the smartphone 200 detects a motion track of the smartphone 200 by using a built-in motion sensor that can detect motion of the smartphone 200, and sends the detected motion track associated with track time information to the vehicle 100 in a wireless communication manner like a Bluetooth, Wi-Fi, UWB, or infrared manner. The track time information indicates time at which the smartphone 200 generates the motion track. Examples of the motion sensor include, for example, an acceleration sensor, and a gyroscope sensor.

In another aspect, the vehicle 100 detects the gesture action of the user 300 by using an optical sensor like a camera. Then, gesture action information of the user 300 detected by using the camera or the like is compared with motion track information of the smartphone 200 received in the wireless communication manner, to determine whether the two are matched (specifically described below). If the two are matched, the vehicle 100 executes the control instruction corresponding to the gesture action of the user 300.

Figure 2:
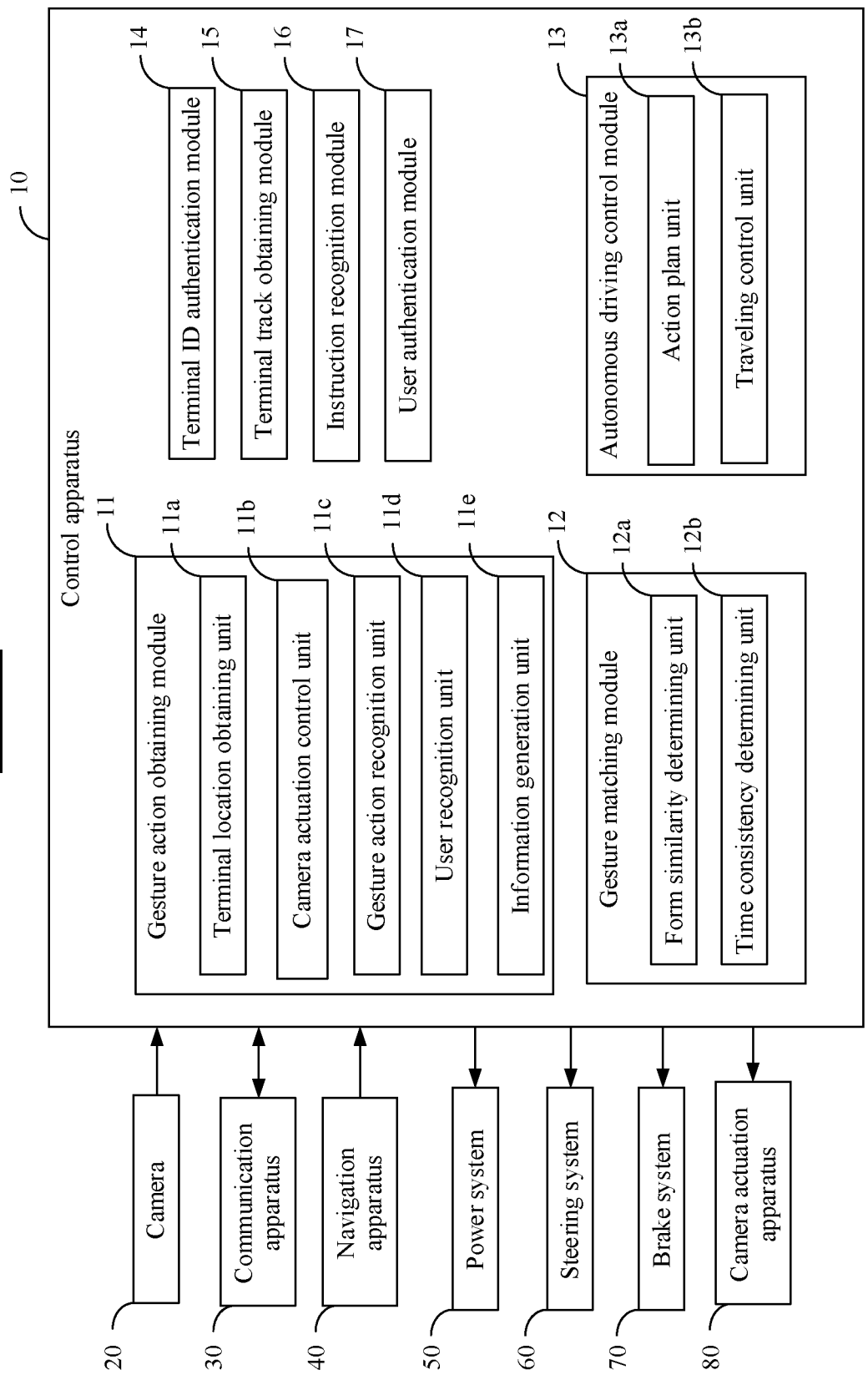
FIG. 2 is a block diagram of a structure of a vehicle according to an embodiment of this application.

The following describes a related structure of the vehicle 100 with reference to FIG. 2.

As shown in FIG. 2, the vehicle 100 has a vehicle control apparatus 10. The vehicle 100 also has a camera 20, a communication apparatus 30, and a navigation apparatus 40. In addition, the vehicle 100 also has a power system 50, a steering system 60, and a brake system 70. Furthermore, in this embodiment, the vehicle 100 also has a camera actuation apparatus 80. Moreover, the vehicle 100 further has a structural element other than these structural elements, but the description is omitted herein.

The camera 20 is configured to detect an environment outside the vehicle. There may be one or more cameras. In this embodiment, the camera 20 is a rotatable camera that can be actuated by the camera actuation apparatus 80 to change an orientation, so as to change a detection range. Furthermore, the camera 20 is an example of an external environment sensor. In addition, a laser radar, a millimeter wave radar, and the like may further be configured to detect the environment outside the vehicle. Furthermore, the camera 20, the laser radar, and the millimeter wave radar are examples of the optical sensor for detecting the gesture action of the user in this application.

The communication apparatus 30 can perform wireless communication with an external object that is not shown in the figure. The external object may include, for example, a base station, a cloud server, a mobile terminal (like a smartphone), a roadside device, and another vehicle that are not shown in the figure.

The navigation apparatus 40 typically has a GNSS (Global Navigation Satellite System, global navigation satellite system) receiver and a map database that are not shown in the figure. The navigation apparatus 40 can determine a location of the vehicle 100 based on a satellite signal received by the GNSS receiver, generate a path to a destination based on map information in the map database, and provide information about the path to the control apparatus 10. In addition, the navigation apparatus 40 may further have an IMU (Inertial Measurement Unit, inertial measurement unit), and performs positioning based on a combination of information of the GNSS receiver and information of the IMU.

The power system 50 has a drive ECU that is not shown in the figure and a drive source that is not shown in the figure. The drive ECU controls a driving force (torque) of the vehicle 100 by controlling the drive source. An example of the drive source may be an engine, a drive motor, or the like. The drive ECU can control the drive source based on an operation performed by a driver on an accelerator pedal, so that the driving force can be controlled. In addition, the drive ECU can alternatively control the drive source based on an instruction sent from the vehicle control apparatus 10, so that the driving force can be controlled. The driving force of the drive source is transmitted to wheels that are not shown in the figure via a transmission that is not shown in the figure or the like, to drive the vehicle 100 to travel.

The steering system 60 has a steering ECU, namely, an EPS (Electric Power Steering, electric power steering) ECU, that is not shown in the figure, and an EPS motor that is not shown in the figure. The steering ECU can control the EPS motor based on an operation performed by the driver on a steering wheel, to control the orientation of the wheels (specifically, steering wheels). In addition, the steering ECU can also control the EPS motor based on an instruction sent from the vehicle control apparatus 10, to control the orientation of the wheels. In addition, steering can alternatively be performed by changing torque distribution or braking force distribution to left and right wheels.

The brake system 70 has a brake ECU that is not shown in the figure and a brake mechanism that is not shown in the figure. The brake mechanism enables brake components to work via a brake motor, a hydraulic mechanism, and the like. The brake ECU can control the brake mechanism based on an operation performed by the driver on a brake pedal, so that the braking force can be controlled. In addition, the brake ECU can alternatively control the brake mechanism based on an instruction sent from the vehicle control apparatus 10, so that the braking force can be controlled. When the vehicle 100 is an electric vehicle or a hybrid vehicle, the brake system 70 may further include an energy recovery brake mechanism.

The vehicle control apparatus 10 may be implemented by one ECU (Electronic Control Unit, electronic control unit), or may be implemented by a combination of a plurality of ECUs. The ECU is a computing device that includes a processor, a memory, and a communication interface that are connected through an internal bus. The memory stores program instructions. When the program instructions are executed by the processor, functions of corresponding functional modules and corresponding functional units are implemented. These functional modules include a gesture action obtaining module 11, a gesture matching module 12, an autonomous driving control module 13, a terminal ID authentication module 14, a terminal track obtaining module 15, an instruction recognition module 16, and a user authentication module 17. That is, the vehicle control apparatus 10 implements these functional modules and/or functional units by the processor executing a program (software). However, the vehicle control apparatus 10 may alternatively implement all or a part of these functional modules and/or functional units by using hardware such as an LSI (Large-Scale Integration, large-scale integration) and an ASIC (Application-Specific Integrated Circuit, application-specific integrated circuit), or may alternatively implement all or a part of these functional modules and/or functional units by using a combination of software and hardware.

The terminal ID authentication module 14 is configured to authenticate validity of an ID of the mobile terminal, to perform authentication on the mobile terminal. For example, for a smartphone of a vehicle owner, the terminal ID authentication module 14 authenticates that an ID of the smartphone is valid, so that the smartphone is authenticated as a valid terminal. In addition, the terminal ID authentication module 14 may further authenticate permission of the mobile terminal, for example, authenticate that the smartphone of the vehicle owner has the highest permission and can perform all control, and authenticate that a smartphone of a family of the vehicle owner has restricted permission, to be specific, the smartphone of the family of the vehicle owner is allowed to perform some control, such as turning on an air conditioner, but is restricted to perform some control, such as controlling the travel of the vehicle 100.

The gesture action obtaining module 11 is configured to obtain gesture action information indicating a gesture action, and includes a terminal location obtaining unit 11a, a camera actuation control unit 11b, a gesture action recognition unit 11c, a user recognition unit 11d, and an information generation unit 11e.

The terminal location obtaining unit 11a is configured to obtain location information of a mobile terminal (like a smartphone) whose ID is authenticated as valid, namely, terminal location information.

The camera actuation control unit 11b is configured to calculate an adjustment amount of the camera 20 based on the location information of the mobile terminal, namely, the terminal location information, and a current orientation of the camera 20, and enable the camera actuation apparatus 80 to actuate the camera 20 based on the adjustment amount, so that a location of the mobile terminal is within the detection range of the camera 20. The camera actuation control unit 11b corresponds to the optical sensor actuation control unit in this application.

The gesture action recognition unit 11c is configured to recognize a gesture action of a user based on an image shot by the camera 20, to obtain gesture action information. In this embodiment, the gesture action information includes gesture action form information and gesture action time information. The gesture action form information indicates a form of the gesture action. The gesture action time information indicates time at which the gesture action is performed. The time may be a time period from a start moment of the gesture action to an end moment of the gesture action.

The user recognition unit 11d is configured to recognize the user based on the image shot by the camera 20. Herein, the gesture action recognition unit 11c and the user recognition unit 11d may be integrated into one unit to simultaneously recognize the user and the gesture action of the user. In this way, processing efficiency can be improved. The information generation unit 11e is configured to generate information to be sent to the mobile terminal. As described below, the information includes information indicating that "the camera is started" or "the gesture recognition function is activated" and information used to request the user to perform a gesture action again.

The terminal track obtaining module 15 is configured to receive terminal track information indicating a motion track of the mobile terminal from the mobile terminal via the communication apparatus 30. In this embodiment, the terminal track information includes track form information and track time information. The track form information indicates a form of the motion track, and the track time information indicates time when the motion track is made, or may be a time period from a start moment to an end moment of the motion track. In another example, the terminal track information may alternatively include only track form information.

The gesture matching module 12 is configured to perform matching on the gesture action information obtained by the gesture action obtaining module 11 and the motion track information obtained by the terminal track obtaining module 15, that is, determine whether the gesture action information matches the motion track information. In this embodiment, the gesture matching module 12 includes a form similarity determining unit 12a and a time consistency determining unit 12b.

The form similarity determining unit 12a is configured to: determine whether a similarity exists between the form of the gesture action and the form of the motion track of the mobile terminal, for example, when the similarity reaches above a specified similarity degree or a predefined similarity threshold, determine that the similarity exists. The form similarity determining unit 12a may use a preset template to compare with the motion track and the gesture action, to determine whether the form of the gesture action is similar to the form of the motion track of the mobile terminal, or may perform matching determining by using a trained track matching model. The track matching model may be obtained by using a motion track of a smart terminal captured when a user performs a predefined gesture action by using a hand holding the smart terminal and a user gesture action captured by a camera as samples to train a CNN (Convolutional Neural Network, convolutional neural network) model or an MLP (Multi-layer perceptron, multi-layer perceptron) model.

The time consistency determining unit 12b is configured to: determine whether consistency exists between the time of the gesture action and the time of the motion track, for example, when the consistency reaches above a specified consistency threshold, determine that the consistency exists.

In this embodiment, when a determining result of the form similarity determining unit 12a is: "the similarity exists", and a determining result of the time consistency determining unit 12b is: "the consistency exists", the gesture matching module 12 determines that the gesture action information matches the motion track information.

The instruction recognition module 16 is configured to recognize a control instruction indicated by a gesture action, for example, may recognize, according to a preset correspondence table between a gesture action template and a control instruction, the control instruction indicated by the gesture action.

The user authentication module 17 is configured to authenticate, as a valid user, the user corresponding to the gesture action that matches the motion track of the mobile terminal. The instruction recognition module 16 may further recognize the control instruction indicated by the gesture action of the user that is authenticated as a valid user by the user authentication module 17. In addition, it may be clearly pointed out that the user authentication module 17 authenticates a "user" in an image, namely, a "user" in information obtained by using a sensor (which is the camera 20 in this embodiment), but the terminal ID authentication module 14 authenticates a terminal ID. The two are different.

The autonomous driving control module 13 is configured to control the vehicle 100 to autonomously travel (autonomously move), and includes an action plan unit 13a and a traveling control unit 13b. The autonomous driving control module 13 is an example of a control execution module in this application.

The action plan unit 13a is configured to: calculate a target track of the vehicle 100 to the destination, determine a traveling condition of the vehicle 100 based on the external environment information detected by the optical sensor like the camera 20, and update the target track to determine various actions of the vehicle 100. The path calculated by the navigation apparatus 40 is a rough path. Correspondingly, the target track calculated by the action plan unit 13a includes more detailed content for controlling acceleration, deceleration, and steering of the vehicle 100 in addition to the rough path calculated by the navigation apparatus 40.

The traveling control unit 13b generates, based on an action plan provided by the action plan unit 13a, control instructions to be sent to the power system 50, the steering system 60, and the brake system 70, to control the power system 50, the steering system 60, and the brake system 70, so that the vehicle 100 travels according to the action plan.

Figure 3:
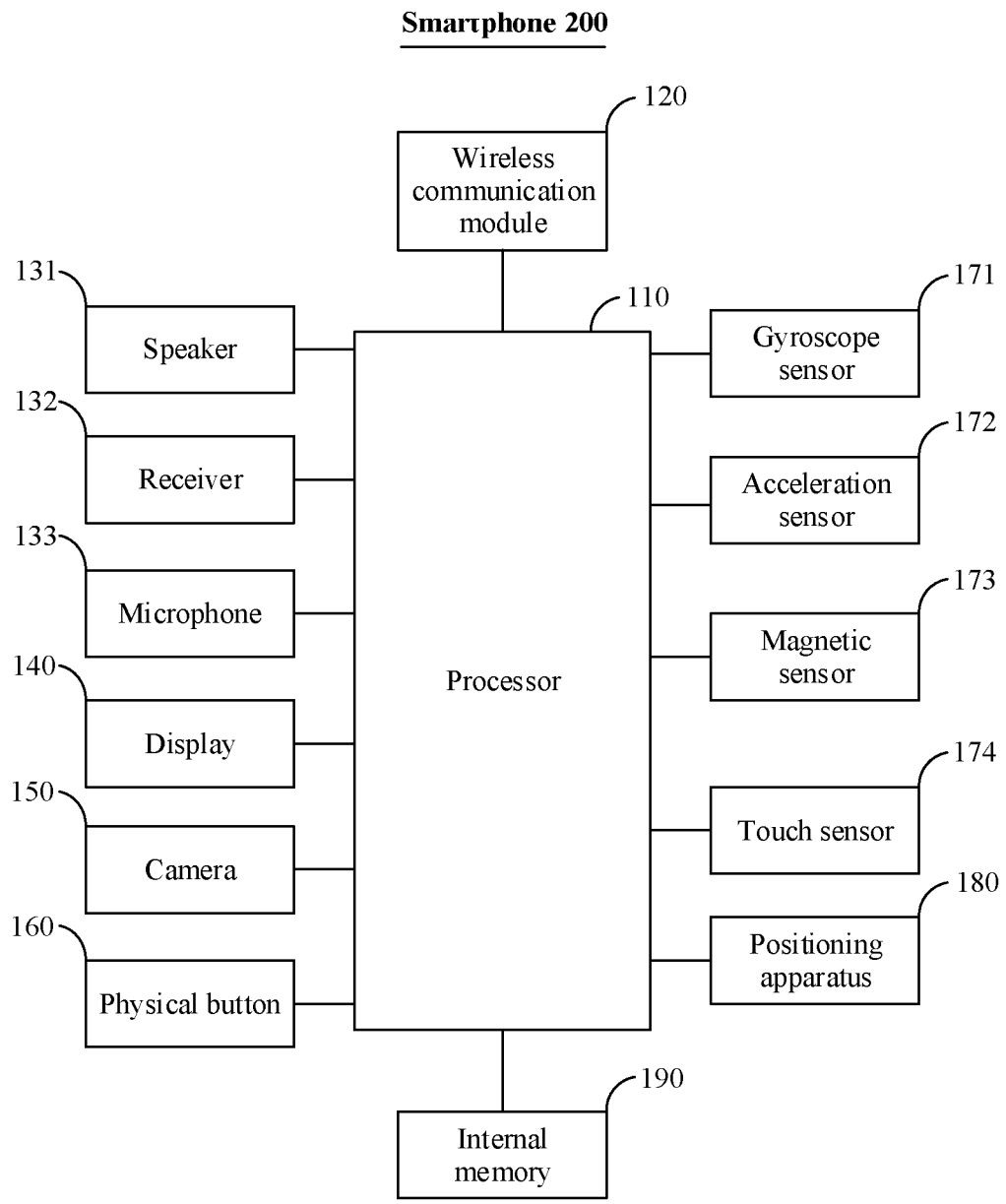
FIG. 3 is a block diagram of a structure of a smartphone according to an embodiment of this application.

The following describes a related structure of the smartphone 200 with reference to FIG. 3.

As shown in FIG. 3, the smartphone 200 includes a processor 110 and an internal memory 190, and further includes a wireless communication module 120, a speaker 131, a receiver 132, a microphone 133, a display 140, a camera 150, a physical button 160, a gyroscope sensor 171, an acceleration sensor 172, a magnetic sensor 173, a touch sensor 174, and a positioning apparatus 180. Furthermore, in addition to these structural elements, the smartphone 200 further includes other structural elements, but description thereof is omitted herein.

The processor 110 may include one or more processing units. For example, the processor 110 may include one or any combination of an application processor (application processor, AP), a modem processor, a graphics processing unit (graphics processing unit, GPU), an image signal processor (image signal processor, ISP), a flight controller, a video codec, a digital signal processor (digital signal processor, DSP), a baseband processor, a neural-network processing unit (neural-network processing unit, NPU), and/or the like. Different processing units may be independent components, or may be integrated into one or more processors.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access and reduces waiting time of the processor 110, thereby improving system efficiency.

In an embodiment, the processor 110 may include one or more interfaces. The interface may include one or any combination of an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identification module, SIM) interface, a universal serial bus (universal serial bus, USB) interface, and/or the like.

The internal memory 190 may be configured to store computer-executable program code, and the executable program code includes instructions. The internal memory 190 may include a program storage area and a data storage area. The program storage area may store an operating system, an application required by at least one function (for example, a voice playing function or an image playing function), and the like. The data storage area may store data (such as audio data and a phone book) and the like created when a portable device is used. In addition, the internal memory 190 may include a high-speed random access memory, and may further include a nonvolatile memory, for example, at least one magnetic disk storage device, a flash memory device, or a universal flash storage (universal flash storage, UFS). The processor 110 executes various function applications and data processing of the smartphone 200 by running the instructions stored in the internal memory 190 and/or the instructions stored in the memory disposed in the processor.

The wireless communication module 120 is configured to implement a wireless communication function of the smartphone 200. The wireless communication function may typically include a wireless communication function like 2G/3G/4G/5G, and may further include a wireless communication function like a wireless local area network (wireless local area network, WLAN) (for example, a Wi-Fi network), an ultra wide band (Ultra Wide Band, UWB), Bluetooth (registered trademark), a global navigation satellite system (global navigation satellite system, GNSS), frequency modulation (frequency modulation, FM), near field communication (near field communication, NFC), or an infrared (infrared, IR) technology.

The speaker 131, the receiver 132, and the microphone 133 belong to audio modules. The speaker 131 is configured to provide a speaker mode. The receiver 132 is also referred to as an earpiece, and is configured to provide a sound playing function in most cases. The microphone 133 is configured to receive a voice of a user.

The display 140 is configured to provide an image or video display function. In addition, in a typical example, the display 140 is configured as a touchscreen, that is, a touch sensor 174 is integrated in the display 140, so that the user can perform a required operation by touching the display 140.

The camera 150 is configured to provide an image or video shooting function, and may typically include a front-facing camera and a rear-facing camera.

The physical button 160 includes, for example, a power button, a volume adjustment button, and the like.

The gyroscope sensor 171 may be configured to determine a posture of the smartphone 200 in a motion process. In some embodiments, an angular velocity of the portable device in a preset coordinate system may be determined by using the gyroscope sensor 171.

The acceleration sensor 172 may detect a movement direction and a movement acceleration of the portable device. A magnitude and direction of gravity can be detected when the portable device is stationary. The acceleration sensor 172 may be further configured to recognize a posture of the portable device, and is used in an application like a pedometer.

The magnetic sensor 173 is a device for detecting corresponding physical parameters by converting magnetism variations of a sensitive element caused by external factors such as a magnetic field, a current, stress and strain, temperature, and light into electrical signals. In some embodiments, included angles between the portable device and four directions, namely, east, south, west, and north, can be measured by using the magnetic sensor.

The positioning apparatus 180 may provide a positioning function for the smartphone 200 by receiving a signal of the global navigation satellite system.

Figure 4:
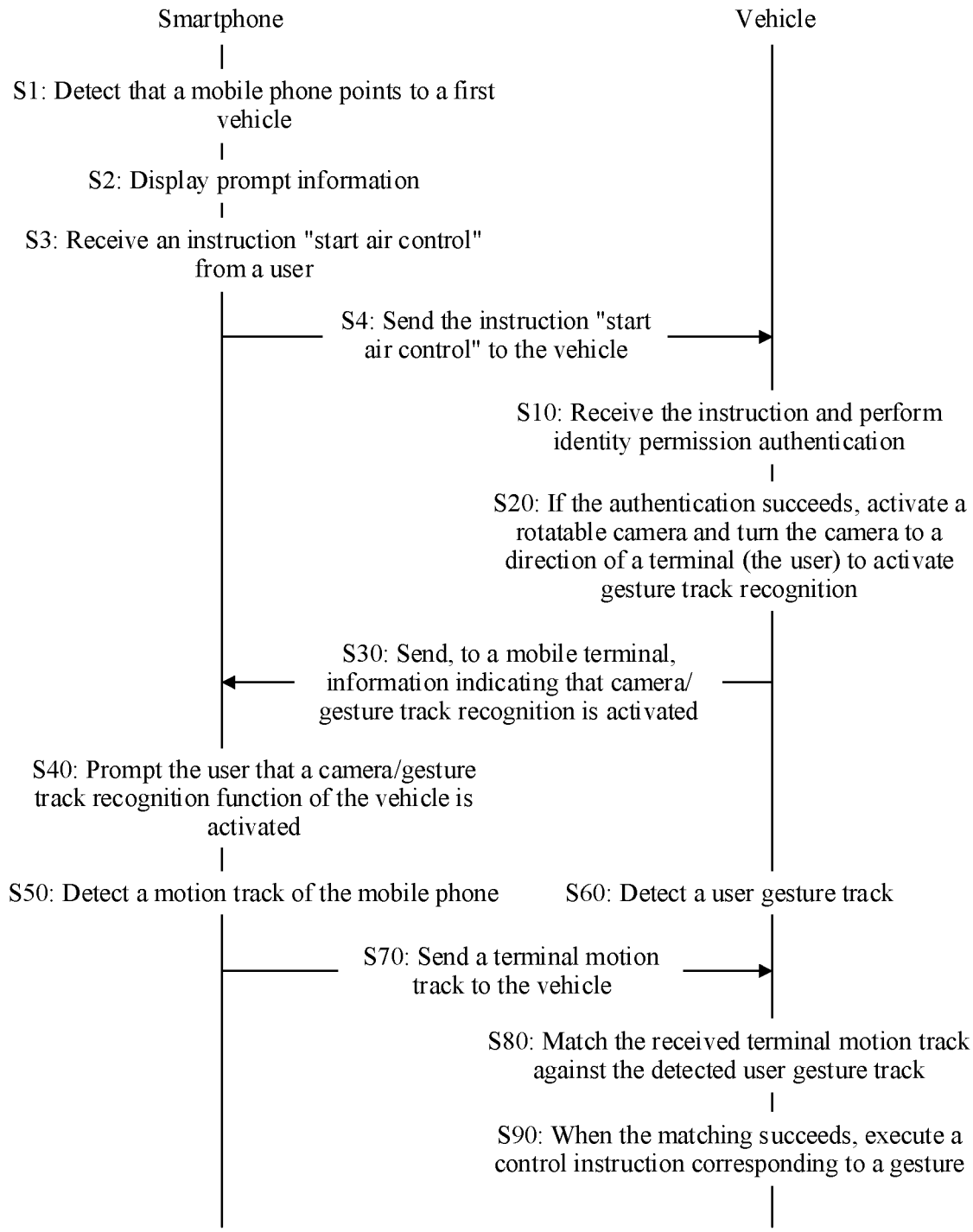
FIG. 4 is an explanatory diagram of a process in which a user interacts with a vehicle by using a smartphone according to an embodiment of this application.

Refer to FIG. 4. The following systematically describes an interaction process in which a user interacts with a vehicle in this embodiment.

As shown in FIG. 4, in step S1, the user 300 enters the parking lot with the smartphone 200, and enters a coverage area of a vehicle-mounted wireless network, like Bluetooth, Wi-Fi, or UWB (Ultra-Wideband, ultra-wideband), of the vehicle 100. In this embodiment, the user 300 is an owner of the vehicle 100, and the smartphone 200 held by the user 300 is bound to the vehicle 100 in advance. Therefore, when the smartphone 200 enters a connection range of the vehicle-mounted wireless network of the vehicle 100, the smartphone 200 automatically establishes a wireless connection to the vehicle 100.

Then, the smartphone 200 monitors whether the smartphone 200 points to the vehicle 100 by using a directional detection technology like Bluetooth, Wi-Fi, or UWB. If the user 300 directs the smartphone 200 to the vehicle 100, it indicates that the user 300 has an intention to perform air control on the vehicle 100. Therefore, by determining whether the smartphone 200 points to the vehicle 100, the smartphone 200 can determine whether the user 300 has the intention to perform air control on the vehicle 100.

Herein, that "the smartphone 200 points to the vehicle 100" may be that "the back points to the vehicle", for example, a straight line perpendicular to the back of the smartphone 200 intersects the vehicle 100. Alternatively, that "the smartphone 200 points to the vehicle 100" may be that "the head points to the vehicle", for example, an extension line L1 (refer to FIG. 1) in a long side direction of the body of the smartphone 200 intersects the vehicle 100.

Figure 7:
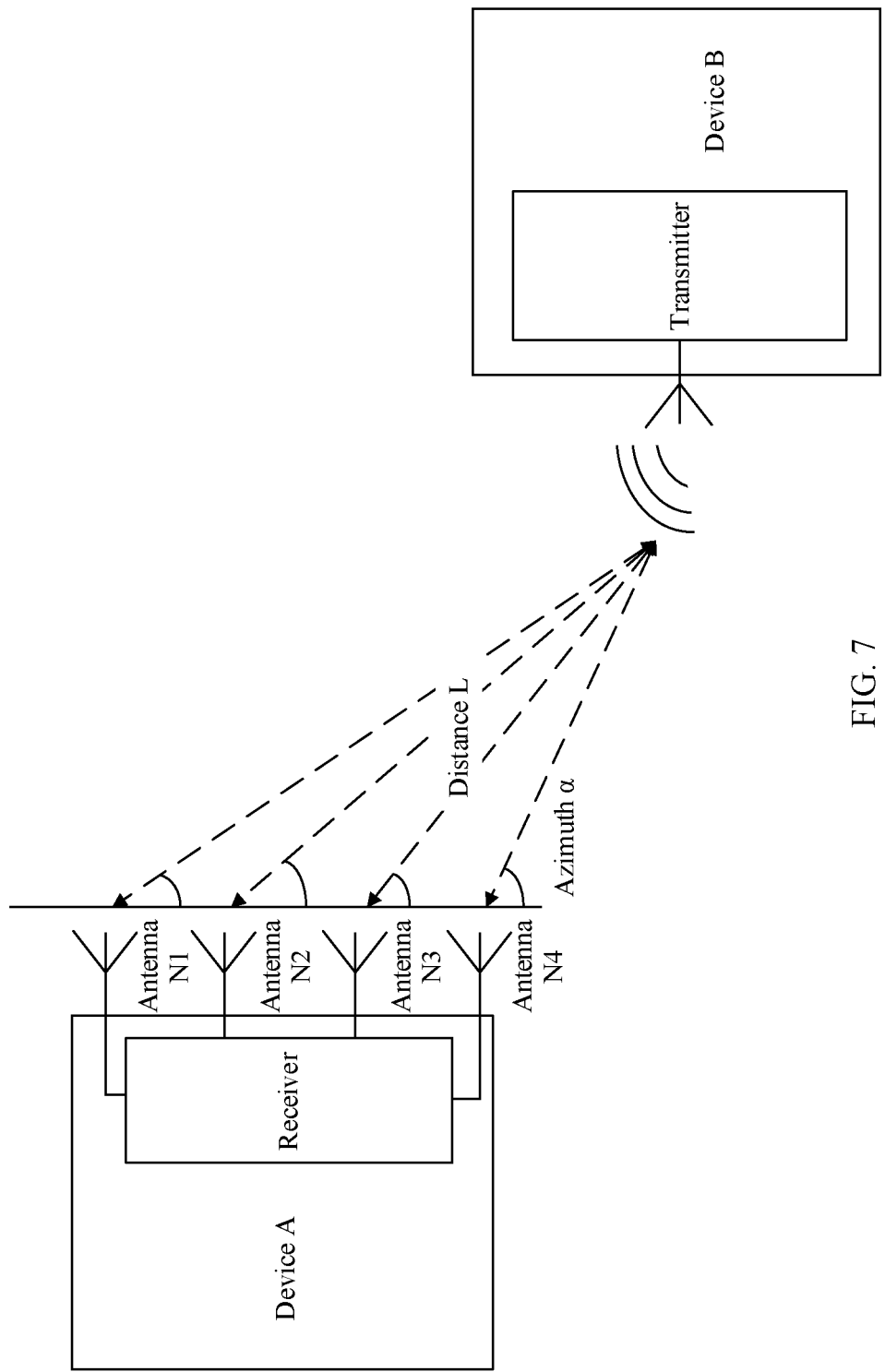
FIG. 7 is an explanatory diagram of a principle of a directional detection technology according to an embodiment of this application.

Refer to FIG. 7. The following briefly describes the directional detection technology used by the smartphone 200 to detect whether the smartphone 200 points to the vehicle 100.

Specifically, as shown in FIG. 7, a signal is transmitted between a device A and a device B via an antenna. Because signal strength gradually attenuates with a propagation distance, a receiver may receive, via a plurality of antennas (four antennas N1 to N4 in FIG. 7), signals sent by a transmitter. Transmission time differences of different received signals are calculated based on strengths of the different received signals, so that an azimuth a and a distance L of the device B relative to the device A are obtained through calculation. By using this directional detection technology, the smartphone 200 can detect an azimuth a between the smartphone 200 and the vehicle 100, and based on a preset coordinate system of the smartphone 200 in factory settings, it can be determined whether the back or the head of the smartphone 200 points to the vehicle 100.

In this embodiment, whether the user 300 has the intention to perform air control on the vehicle 100 can be determined by determining whether the smartphone 200 points to the vehicle 100. Therefore, when it is detected that the smartphone 200 points to the vehicle 100, the user is prompted that the smartphone 200 has established a connection to the vehicle 100, so that the user is not bored by giving useless prompts when the user does not have the intention to perform air control on the vehicle 100.

In addition, in another example, before detecting whether the smartphone 200 points to the vehicle 100, the gyroscope sensor 171, the acceleration sensor 172, the magnetic sensor 173, and the like of the smartphone 200 may be used to first detect whether the motion track of the smartphone 200 is a "preset track". For example, the smartphone 200 is changed from a horizontal state to a vertical state, and when the motion track of the smartphone 200 is the "preset track", it is then detected whether the smartphone 200 points to the vehicle 100. This can avoid instantly detecting whether the smartphone 200 points to the vehicle 100 after the smartphone 200 is automatically connected to the vehicle 100, and reduce power consumption, and can also avoid false triggering caused when the smartphone 200 points to the vehicle 100, not intended by the user 300, after the smartphone 200 is automatically connected to the vehicle 100, to improve accuracy of confirming an intention of the user.

When the smartphone 200 detects that the smartphone points to the vehicle 100, step S2 is performed.

Figure 8A:
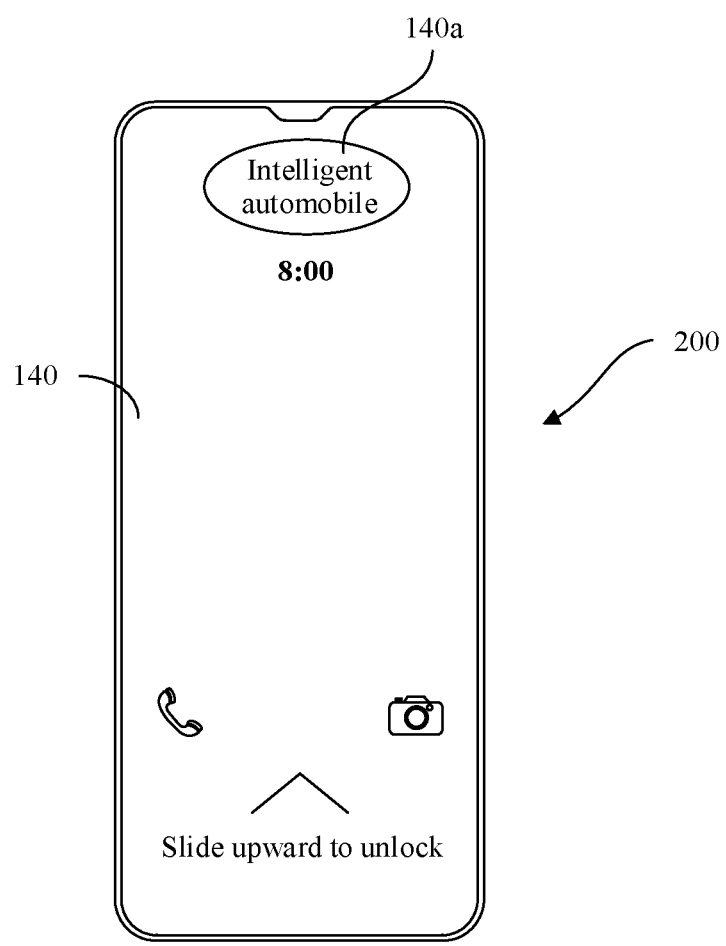
FIG. 8A shows an example of a display picture of a smartphone according to an embodiment of this application.

In step S2, as shown in FIG. 8A, the smartphone 200 displays prompt information 140a on the display 140 (for example, on a lock screen), to prompt the user 300 that the pointed vehicle 100 is recognized and a wireless connection is established, so that the vehicle 100 may be remotely controlled by using the smartphone 200. In another example, the user may alternatively be prompted by a voice from the speaker 131, or the user may be prompted through vibration of the smartphone 200.

In addition, in another example, the "determining whether the smartphone 200 points to the vehicle 100" in step S1 may be omitted, and after the smartphone 200 establishes a wireless connection to the vehicle 100, step S2 is directly performed. The prompt information 140a is displayed on the display 140 of the smartphone 200, or a voice prompt is sent via the speaker 131 of the smartphone 200. As described above, in this embodiment, the prompt information 140a is displayed on a condition that it is detected that the smartphone 200 points to the vehicle 100, so that display of the prompt information 140a can be more consistent with the intention of the user 300, to avoid boring the user 300.

After the prompt information 140a is displayed, step S3 is performed.

In step S3, the smartphone 200 sets, as the vehicle 100, an operation object of a physical button 160 on the smartphone 200. For example, pressing and holding a power button for 3 seconds is defined as requesting the vehicle 100 to activate an air control function. The smartphone monitors whether the predefined operation like pressing and holding the power button for 3 seconds is received.

In addition, as a substitute of "pressing and holding the power button for 3 seconds", the predefined operation may alternatively be tapping a corresponding virtual operation button on an operation interface of the foregoing vehicle control APP, where the virtual operation button is configured to "activate an air control function of a vehicle".

In addition, in another example, in step S3, the operation object of the physical button 160 may alternatively not be set as the vehicle 100. In this case, when the user 300 performs a slide operation on the prompt information 140a, an operation interface of a vehicle control APP (Application, application) may pop up on the display 140, and the operation interface includes a virtual button configured to "activate an air control function of a vehicle".

When the preset operation, like pressing and holding the power button for 3 seconds, that is performed by the user is received, step S4 is performed.

In step S4, the smartphone 200 sends, to the vehicle 100, an instruction for requesting to activate the air control function, and location information (namely, terminal location information) and ID information (namely, terminal ID information) of the smartphone 200 may be sent simultaneously.

In another example, step S3 and step S4 may be omitted. In the absence of step S3 and step S4, in step S2, when displaying the prompt information 140a, the smartphone 200 may automatically send, to the vehicle 100, an instruction indicating to "activate an air control function of a vehicle", without the need for the user 300 to press and hold the power button for 3 seconds. In this embodiment, step S3 and step S4 are used, so that a misoperation can be prevented. After the intention of the user is determined based on the preset operation (namely, the operation of pressing and holding the power button), the instruction indicating to "activate an air control function of a vehicle" may be sent to the vehicle 100. This can prevent the vehicle 100 from incorrectly activating the air control function, and reduce energy consumption.

When the smartphone 200 sends the instruction indicating to "activate an air control function of a vehicle", in step S10, the vehicle 100 receives the instruction and the terminal location information and terminal ID information that are simultaneously sent with the instruction, and then the vehicle 100 performs authentication on a user identity and/or permission based on the terminal ID information. The smartphone 200 is a mobile phone of the owner of the vehicle 100, and therefore, the vehicle 100 authenticates an ID of the smartphone 200 as a valid ID in step S10. After a terminal ID is authenticated as the valid ID, step S20 is performed.

In step S20, the vehicle 100 starts the rotatable camera 20, adjusts an orientation of the camera 20 based on the terminal location information sent from the smartphone 200, turns the camera 20 to a direction of the smartphone 200, namely, a direction of the user, and activates a gesture recognition function.

In another example, the camera 20 may alternatively be a camera with a fixed angle. In this case, the user needs to stand within the detection range of the camera 20 and perform a gesture action. In addition, in this embodiment, the camera is used as an example for description. However, another optical sensor like a millimeter wave radar that can recognize the gesture action may alternatively be used as an example for description.

After the vehicle 100 completes adjustment of the camera 20 (that is, completes preparations for gesture recognition), and activates the gesture recognition function, step S30 is performed.

In step S30, the vehicle 100 sends, to the smartphone 200, information indicating that the camera and/or the gesture action recognition function is activated.

Figure 8B:
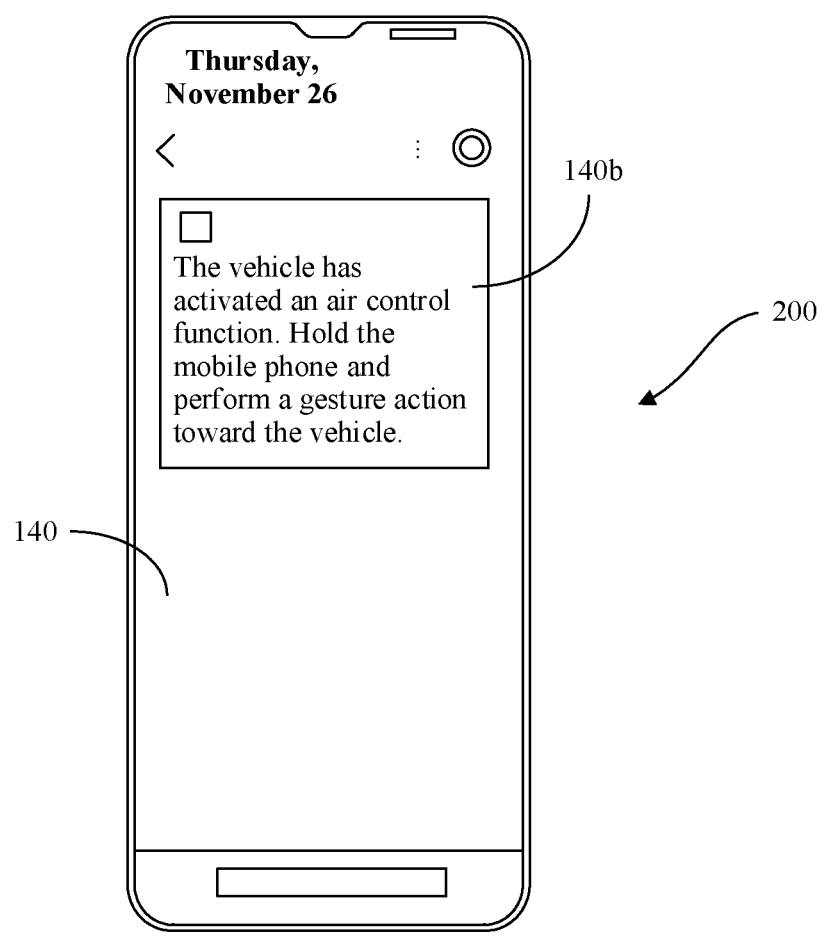
FIG. 8B shows an example of a display picture of a smartphone according to an embodiment of this application.

In step S40, the smartphone 200 receives the message. As shown in FIG. 8B, a prompt message is displayed on the display 140, so that the user knows that the gesture action recognition function of the vehicle 100 is activated, and the user 300 is prompted that a gesture action may be performed toward the vehicle 100. In addition, the user may alternatively be prompted by a voice from the speaker 131, or the user may alternatively be prompted through vibration of the smartphone 200.

Then, the user 300 performs the predefined gesture action by using the hand (or the arm) holding the smartphone 200, where the predefined gesture action is the gesture action corresponding to the control instruction, for example, two waves of the hand, indicating to summon the vehicle 100 to travel to a location of the user 100.

In this case, in one aspect, in step S50, the motion track of the smartphone 200 is detected by the smartphone 200.

In another aspect, in step S60, the gesture action of the user 300 is detected by the vehicle 100 via the camera 20, so that the gesture action information is obtained. Optionally, the gesture action information generated by the vehicle 100 includes time information of the gesture action, and the time information may be information of a time period from a start moment of the gesture action to an end moment of the gesture action. In addition, the gesture action performed by the user 300 by using the hand holding the smartphone 200 in this embodiment corresponds to the first gesture action in this application. Accordingly, the gesture action information that is obtained by the vehicle 100 via the camera 20 and that is about the first gesture action herein corresponds to the first gesture action information in this application. The time information for performing the first gesture action corresponds to "information about first time at which the first gesture action is performed" in this application.

In addition, in step S70, after step S50, the smartphone 200 sends, to the vehicle 100, terminal track information indicating the motion track of the smartphone 200. Further, optionally, time information about the detected motion track of the smartphone 200 is also attached to, that is, time information indicating generation time of the motion track of the smartphone 200 is sent to the smartphone 200. The time information may be information of a time period from a start moment of the motion track of the smartphone 200 to an end moment of the motion track of the smartphone 200. Herein, the "time information about the motion track of the smartphone 200" corresponds to "information about second time at which the motion track is generated" in this application.

In step S80, the vehicle 100 compares the received motion track information of the smartphone 200 with the detected gesture action information of the user 300, to determine whether the gesture action of the user 300 matches the motion track of the smartphone 200. A preset template may be used to compare a motion track and a gesture action, to determine whether a form of the gesture action is similar to a form of the motion track of a mobile terminal, or matching determining may be performed by using a trained track matching model. The track matching model may be obtained by using a motion track of a smartphone captured when a user performs a predefined gesture action by using a hand holding the smartphone and a user gesture action captured by a camera as samples to train a CNN (Convolutional Neural Network, convolutional neural network) model or an MLP (Multi-layer perceptron, multi-layer perceptron) model.

In this embodiment, not only a similarity between a form of a motion track and a form of a user gesture is compared, but also consistency between time information of the motion track and time information of the user gesture is compared, and on this basis, a matching determining result is obtained. To be specific, when a similarity between a form of a gesture action and a form of a motion track is greater than a first similarity threshold, and consistency between time information of the gesture action and time information of the motion track is greater than a first consistency threshold, the gesture action can be determined to match the motion track. In addition, when there are a plurality of gesture actions whose similarities between forms of the gesture actions and the form of the motion track are greater than a predefined threshold, a gesture action whose time information is most consistent with the time information of the motion track is selected as an object matching the motion track.

In addition, in another example, "whether the gesture action of the user 300 matches the motion track of the smartphone 200" may alternatively be determined only based on the similarity between the form of the motion track and the form of the user gesture.

When it is determined that the gesture action matches the terminal track, step S90 is performed.

In step S90, the vehicle 100 executes the control instruction corresponding to the gesture action. For example, it is preset that two waves of the hand correspond to summoning the vehicle to travel to the location of the user. In this case, the vehicle 100 is powered on, an autonomous driving function is activated, and the vehicle 100 is controlled to travel to the location of the user 300 based on the autonomous driving function.

The foregoing describes the overall process in which the user 300 interacts with the vehicle 100 by using the smartphone 200. The following separately describes in detail a processing procedure on a side of the vehicle 100 and a processing procedure on a side of the smartphone 200, to describe this embodiment in more detail.

Figures 1, 5A:
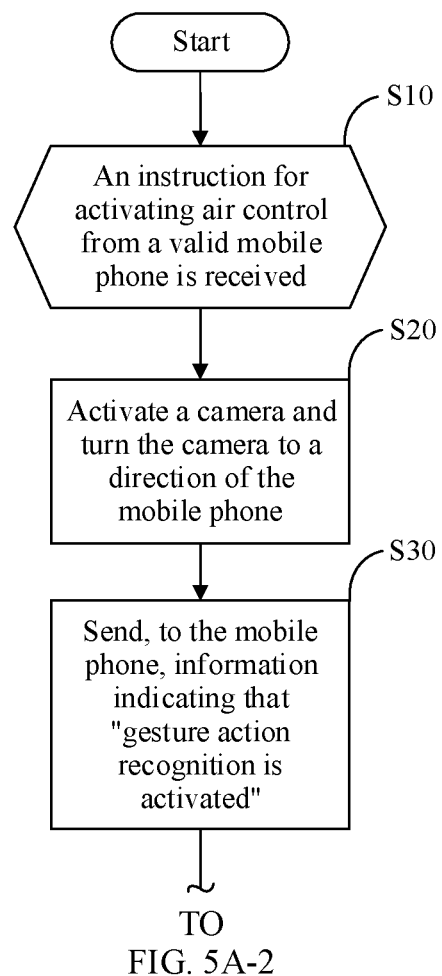
Figures 2, 5A:
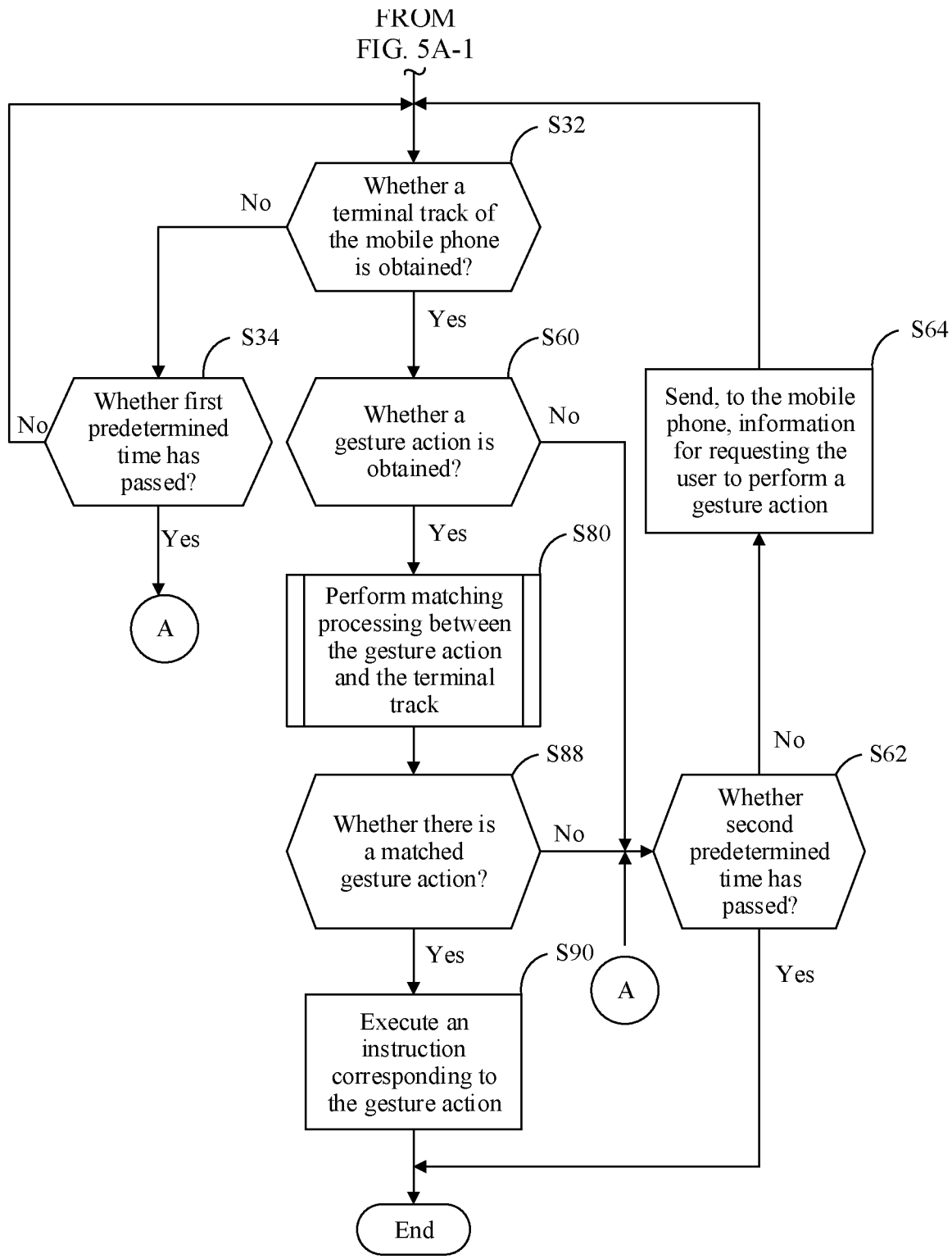

First, an example of the processing procedure on the side of the vehicle 100 is described with reference to FIG. 5A-1 and FIG. 5A-2. The processing procedure shown in FIG. 5A-1 and FIG. 5A-2 is performed by the control apparatus 10 of the vehicle 100. As shown in FIG. 5A-1 and FIG. 5A-2, in step S10, the control apparatus 10 determines whether an instruction for activating an air control function from a valid terminal is received. Specifically, the control apparatus 10 monitors whether an instruction for requesting to activate the air control function (to which the terminal ID information and the terminal location information are attached) is received from the mobile terminal via the communication apparatus 30. When the instruction for requesting to activate the air control function is received from the mobile terminal, the terminal ID authentication module 14 determines whether the mobile terminal is the valid terminal based on the terminal ID of the mobile terminal. If it is determined that the mobile terminal is the valid terminal, step S20 is performed, or if it is determined that the mobile terminal is not the valid terminal, step 10 is performed, and monitoring continues. In this embodiment, when the smartphone 200 sends the foregoing instruction to the vehicle 100, the terminal ID authentication module 14 authenticates the smartphone 200 as the valid terminal. In the following description, this is used as an example for description.

In addition, when the smartphone 200 is authenticated as the valid terminal, the terminal location obtaining unit 11*a* obtains the terminal location information of the smartphone 200.

In step S20, the control apparatus 10 activates the camera 20, and determines whether a terminal location is within the detection range of the camera 20 based on the terminal location information. When the terminal location is not within the detection range of the camera 20, the camera actuation control unit 11*b* adjusts the orientation of the camera 20 via the camera actuation apparatus 80, so that the terminal location is within the detection range of the camera 20.

Next, in step S30, information indicating that "the camera is started" or "the gesture action recognition function is activated" is generated by the information generation unit 11*e*, and the control apparatus 10 sends the information to the smartphone 200 via the communication apparatus 30.

Figure 8C:
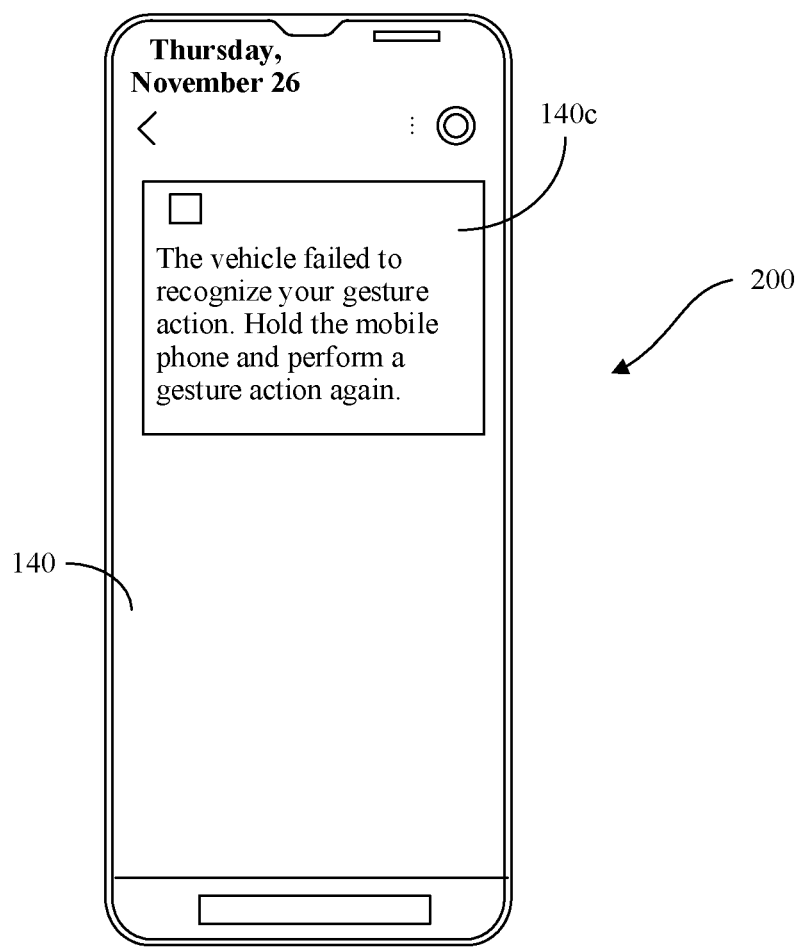
FIG. 8C shows an example of a display picture of a smartphone according to an embodiment of this application.

Then, in step S32, it is determined whether the terminal track information sent from the smartphone 200 is obtained by the terminal track obtaining module 15 via the communication apparatus 30. If the terminal track information is obtained, step S60 is performed. If the terminal track information is not obtained, step S34 is performed. In step S34, it is determined whether a first predefined time period has passed from step S30, namely, from a time point at which the information indicating that "the camera is started" or "the gesture action recognition function is activated" is sent to the mobile terminal, to a current moment. If the first predefined time period has not passed, step S32 is returned to continue the monitoring, or if the first predefined time period has passed, step S62 is performed. In step S62, it is determined whether a second predefined time period that is greater than the first predefined time period has passed from step S30 to the current moment. If the second predefined time period has passed, the processing is ended. If the second predefined time period has not passed, step S64 is performed. The information generation unit 11*e* generates information for requesting the user to perform a gesture action, the control apparatus 10 sends the message to the mobile terminal via the communication apparatus 30, and then step S32 is returned to continue to monitor whether the terminal track information of the mobile terminal is obtained. In this case, on the mobile terminal side, as shown in FIG. 8C, for example, the user is prompted in a display manner to request to perform a gesture action.

Further, in step S60, it is determined whether a gesture action is recognized by the gesture action recognition unit 11*c* based on detection information of the camera 20. In this embodiment, after step S20, the gesture action recognition unit 11*c* is activated to continuously perform image processing or the like on image information obtained by the camera 20 to recognize the gesture action. However, in another example, after it is determined that the terminal track information is obtained in step S32 (that is, "YES" in step S32), a time period from a start moment to an end moment of terminal motion may alternatively be obtained based on terminal track time information included in the terminal track information. A time range for performing image recognition on the image information obtained by the camera 20 is set based on the time period, and image recognition is performed only on image information within the time range to obtain the gesture action information. In this way, a calculation amount of the gesture action recognition unit 11*c* can be reduced, and power consumption can be reduced. In addition, because a gesture action performed outside this time range (for example, a gesture action performed by another user (referred to as an invalid user) other than the user 300) is not obtained, a quantity of obtained gesture actions is reduced. Therefore, a calculation amount of the gesture matching module 12 can also be reduced, and a processing speed is improved.

If it is determined in step S60 that the gesture action is obtained, step S80 is performed. If no gesture action is obtained, step S62 is performed. If it is determined in step S62 that the second predefined time period has not passed, information requesting the user to perform a gesture action is sent to the mobile terminal, and then step S32 is returned to continue to monitor whether the terminal track information is obtained.

In addition, in step S80, it is determined whether the obtained gesture action information matches the terminal track information. Herein, it is determined whether all obtained gesture action information matches the terminal track information one by one. That is, sometimes there is another user (referred to as an invalid user) next to the user 300, and the another user also performs a gesture action. In this case, the gesture action recognition unit 11*c* not only recognizes the gesture action of the user 300, but also recognizes the gesture action of the invalid user. In this case, in step S80, it is determined whether all obtained gesture action information matches the terminal track information one by one. In addition, certainly, when only one piece of gesture action information is obtained, the determining is performed only on the one piece of gesture action information.

In addition, a specific determining process in step S80 will be described later with reference to FIG. 5B.

After step S80, step S88 is performed, where it is determined whether there is a gesture action that matches the motion track of the smartphone 200. When it is determined that there is a gesture action that matches the smartphone 200, step S90 is performed, where a control instruction corresponding to the gesture action is obtained and executed. Specifically, the instruction recognition module 16 recognizes the control instruction corresponding to the successfully matched gesture action, and then the control apparatus 10 performs processing to execute the control instruction. In this embodiment, an example in which the gesture action indicates "traveling to the location of the user who performs the gesture action" is used for description. In this case, the vehicle 100 uses, as a target, the user 300 who is recognized by the user recognition unit 11*d* and who performs the gesture action, and continuously tracks the user 300 based on the detection information of the camera 20. The autonomous driving control module 13 controls the vehicle 100 to travel to the location of the user 300 until the vehicle 100 reaches the location of the user 300.

After step S90, current processing is ended.

When it is determined that the matching fails in step S88, step S62 is performed, where it is determined whether the second predefined time period has passed. If it is determined that the second predefined time period has not passed in step S62, the information for requesting the user to perform a gesture action is sent to the mobile terminal; and then step S32 is returned to continue to monitor whether the terminal track information is obtained.

Figure 5B:
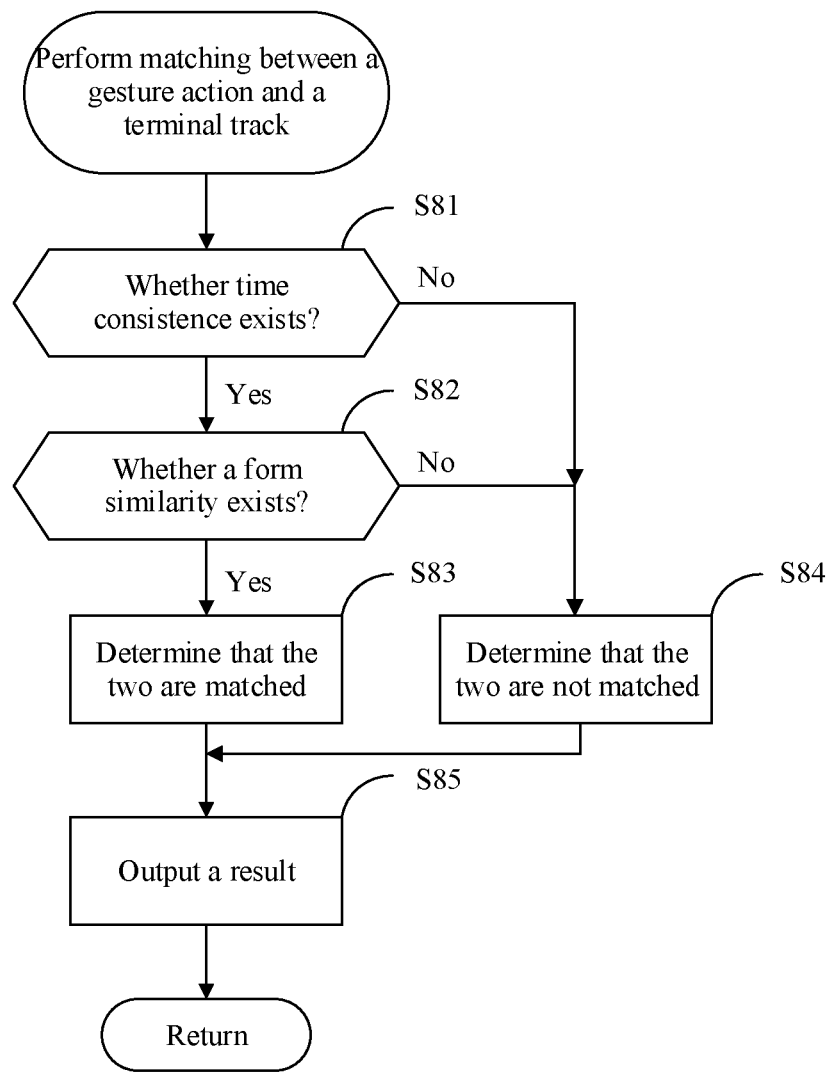
FIG. 5B is an explanatory diagram of specific content of matching between a gesture action and a terminal track in FIG. 5A-1 and FIG. 5A-2.

The following describes detailed content of "processing for determining whether the gesture action matches the terminal track" in step S80 with reference to FIG. 5B. As shown in FIG. 5B, in step S81, the time consistency determining unit 12b determines, based on the time information in the gesture action information and the time information in the terminal track information, whether time of the gesture action is consistent with time of the terminal track. For example, when a degree of consistency (a degree of overlap) between the time of the gesture action and the time of the terminal track is greater than a predefined consistency threshold, it is determined that the time of the gesture action is consistent with the time of the terminal track.

When a determining result of step S81 is "consistent", step S82 is performed; or when a determining result is "inconsistent", step S84 is performed, and it is determined that the gesture action does not match the terminal track.

In step S82, the form similarity determining unit 12a determines, based on the gesture action form information in the gesture action information and the track form information in the terminal track information, whether the form of the gesture action is similar to the form of the terminal track. For example, when the similarity between the two is greater than a predefined similarity threshold, it is determined that the two are similar. When a determining result in step S82 is "similar", step S83 is performed, where it is determined that the gesture action matches the terminal track; or when a determining result in step S82 is "dissimilar", step S84 is performed, where it is determined that the gesture action does not match the terminal track.

After steps S83 and S84, step S85 is performed, where a determining result is output. Herein, FIG. 5B shows a processing procedure for determining whether a gesture action matches a terminal track. When there are a plurality of gesture actions, such a processing procedure is separately performed on these gesture actions. However, in a final output determining result, only one gesture action matches the terminal track. That is, in the determining result output in step S85, only one gesture action but not a plurality of gesture actions can successfully match the terminal track. For example, when it is determined in step S81 and step S82 that consistency between a plurality of gesture actions and the terminal track is greater than the predefined consistency threshold and form similarities are greater than the predefined similarity threshold, further processing is performed. That is, in these gesture actions, a gesture action has the highest degree of time consistency with the terminal track or the highest degree of form similarity with the terminal track is determined, and the gesture action is determined as a final gesture action that successfully matches the terminal track.

Figure 6:
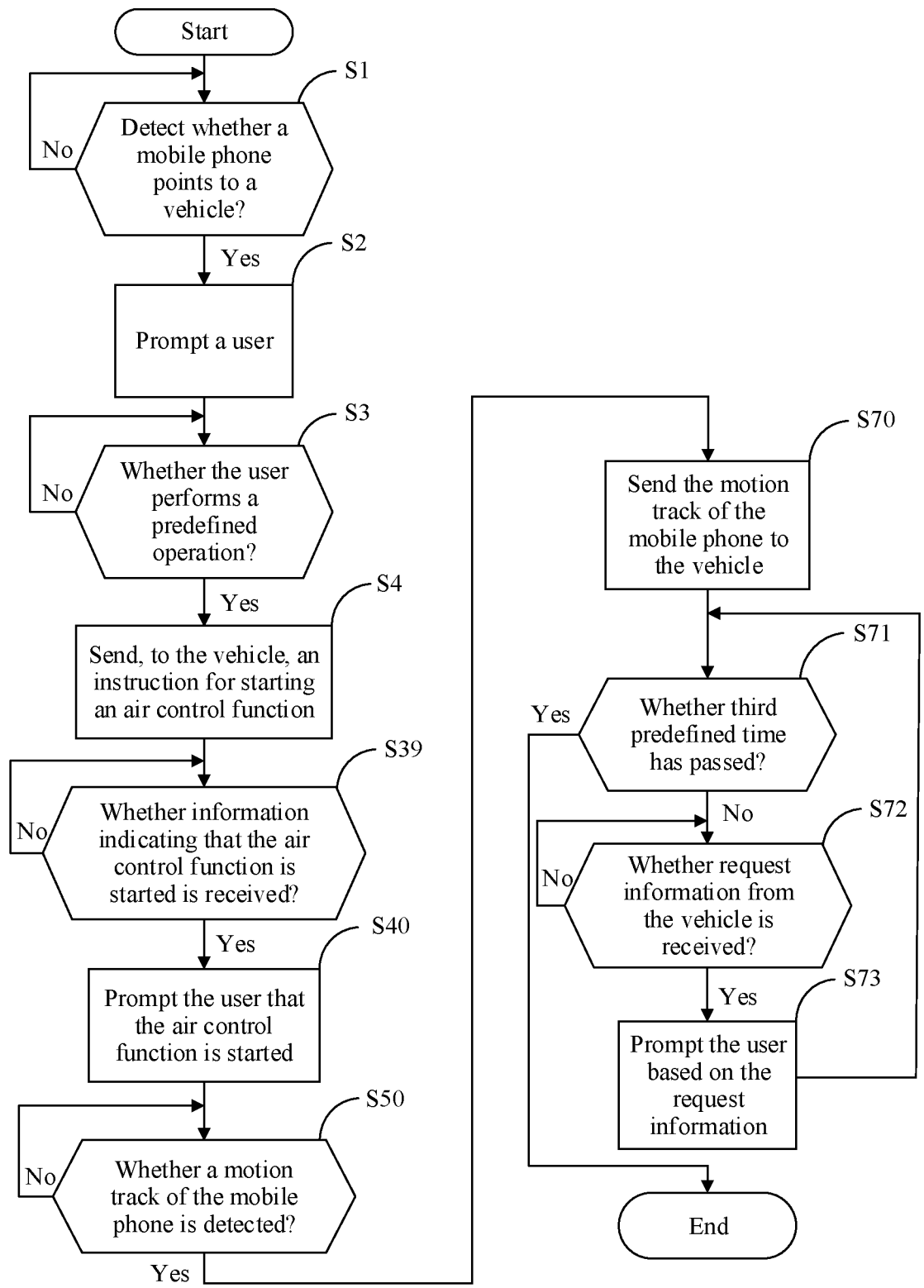
FIG. 6 is a processing flowchart on a smartphone side according to an embodiment of this application.

The following describes an example of the processing procedure on the side of the smartphone 200 with reference to FIG. 6. The processing procedure is performed by the processor 110 of the smartphone 200. In addition, the processing procedure may be started on a condition that the smartphone 200 successfully connects to the vehicle 100 via Bluetooth, UWB, Wi-Fi or the like.

As shown in FIG. 6, in step S1, the processor 110 monitors whether the smartphone 200 points to the vehicle 100, that is, whether it is detected that the smartphone 200 points to the vehicle 100. As described above, it may be detected, via an acceleration sensor and/or a gyroscope sensor of the smart terminal and by using a Bluetooth/UWB/Wi-Fi directional detection/positioning technology, that the smart terminal changes from an initial posture to a state in which the back of the smart terminal points to the vehicle, to determine whether the smart terminal points to the vehicle.

When it is detected that the smartphone 200 points to the vehicle 100, step S2 is performed. In this case, a prompt is displayed on the display 140 of the smartphone 200, to notify the user that the smartphone 200 has recognized the pointed vehicle 100 and is successfully connected to the vehicle 100, so that the user knows that the vehicle 100 can be controlled by using the smartphone 200.

Then, step S3 is performed, where it is monitored whether the user performs a predefined operation on the smartphone 200. The predefined operation indicates that the user wants the vehicle 100 to activate the air control function, for example, the predefined operation may be pressing and holding the power button for a predefined time period (for example, 3 seconds).

In step S3, when receiving the predefined operation performed by the user, the smartphone 200 sends, to the vehicle 100 via the wireless communication module 120, a control instruction for activating the air control function.

Subsequently, step S39 is performed, where the feedback information sent from the vehicle 100 is monitored. After information, from the vehicle 100, indicating that the air control function is activated is received, step S40 is performed.

In step S40, information is displayed on the display 140 to prompt the user that the vehicle 100 has activated the air control function.

Then, step S50 is performed, where the motion track of the smartphone 200 is detected by using sensor information of the acceleration sensor 172 and/or the gyroscope sensor 171. When the motion track of the smartphone 200 is detected to obtain the motion track information, step S70 is performed, where the motion track information is sent to the vehicle 100 via the wireless communication module 120. As described above, the motion track information is used for being compared with the gesture action information. Therefore, to improve reliability of a comparison result, the motion track information may be motion track information generated when the smartphone 200 moves after the user performs a predefined operation on the smartphone 200. For example, when the user sends a voice instruction "start", the motion track of the smartphone 200 is detected; when the user sends a voice instruction "end", the detecting the motion track of the smartphone 200 is stopped; and the motion track information generated when the smartphone 200 moves within a time period from the "start" to the "end" is sent to the vehicle 100.

After step S70, step S71 is performed, where it is determined whether third predefined time has passed. When the third predefined time has passed, the current processing procedure is ended; or when the third predefined time has not passed, step S72 is performed.

In step S72, it is monitored whether request information is received from the vehicle 100. Specifically, sometimes the side of the vehicle 100 may not accurately recognize the gesture action of the user. In this case, the vehicle 100 sends the request information to the smartphone 200, to request the user to perform a gesture action again (step S64 in FIG. 5A-2). When the request information is received, step S73 is performed. As shown in FIG. 8C, information is displayed on the display 140 to prompt the user to perform a gesture action again by using the hand holding the smartphone 200.

Subsequently, step S71 is returned. Whether the third predefined time has passed continues to be determined until it is determined that the third predefined time has passed, and then the current processing procedure is ended.

In the embodiment described above, when the gesture action is detected, the vehicle 100 compares the gesture action with the motion track of the smartphone 200 held by the user 300, to determine whether the two are matched, and executes the control instruction corresponding to the gesture action when it is determined that the two are matched. Therefore, even if there is another user next to the user 300 and the another user performs the predefined gesture action corresponding to the control instruction, the vehicle 100 does not incorrectly respond based on the gesture action. In this way, in the embodiment described above, it is determined that the control instruction corresponding to the gesture action is executed on a condition that the gesture action matches the motion track of the smartphone 200. Therefore, even if facial recognition is not performed, the vehicle 100 can effectively recognize the valid gesture action. From a perspective of human-machine interaction, effective interaction between the user 300 and the vehicle 100 can be implemented even if facial recognition is not performed.

In the foregoing description, the vehicle 100 adjusts the orientation of the rotatable camera 21, so that the smartphone 200 or the user 300 is within the detection range of the camera 21. However, in another embodiment, a plurality of cameras 21 with different orientations, namely, different detection ranges, may be configured on the vehicle 100. It is determined, based on the location of the smartphone 200, which camera or cameras 21 the smartphone 200 is within a detection range, so that the gesture action of the user 300 is recognized by using detection information of a corresponding camera 21.

In addition, in the foregoing description, the control instruction for enabling the vehicle 100 to travel to the location of the user 300 is indicated by the gesture action performed by the user 300. However, in this embodiment, other control instructions such as a control instruction for unlocking a vehicle door and a control instruction for turning on an air conditioner are also applicable. In this case, control for traveling toward the location of the user 300, control for unlocking the vehicle door, and control for turning on the air conditioner that are executed on the side of the vehicle 100 are all examples of the first control in this application.

In addition, in the foregoing description, a user recognition function and the gesture action recognition function of the vehicle 100 are integrated into one unit, namely, a user and gesture action recognition unit. However, in another embodiment, a user recognition unit and a gesture action recognition unit may alternatively be separately disposed.

In addition, in the foregoing description, the user 300 uses the hand holding the smartphone 200 to perform the gesture action indicating the corresponding control instruction, and the vehicle 100 determines, by matching the gesture action with the motion track of the smartphone 200, whether to execute the control instruction indicated by the gesture action. However, in another example, after the user 300 performs the gesture action by using the hand holding the smartphone 200 for the first time, the vehicle 100 may alternatively determine whether the gesture action matches the motion track of the smartphone 200, and authenticates the user 300 who performs the gesture action as a valid user after determining that the gesture action matches the motion track of the smartphone 200. Then, the valid user is continuously recognized by using a visual tracking technology, and the control instruction indicated by the gesture action of the valid user is executed. In this way, for example, the user 300 needs to hold the smartphone 200 only when performing the gesture action for the first time and use the hand holding the smartphone 200 to perform the gesture action, and a subsequent air operation does not need to be conditional on holding the smartphone 200, so that convenience of the air operation is improved.

The gesture action performed by the user 300 herein by holding the smartphone 200 corresponds to the first gesture action in this application. Accordingly, the gesture action information that is obtained by the vehicle 100 via the camera 20 and the like and that is related to the first gesture action corresponds to the first gesture action information in this application. After the user 300 is authenticated as a valid user, the gesture action performed by the user 300 corresponds to the second gesture action in this application. Accordingly, the gesture action information that is obtained by the vehicle 100 via the camera 20 and the like and that is related to the second gesture action corresponds to the second gesture action information in this application.

In addition, in the foregoing description, an example in which the smartphone 200 serves as the mobile terminal is used for description. However, this application is not limited thereto. Specifically, the smartphone 200 may be replaced by another mobile terminal with functions of detecting a motion track of the mobile terminal and establishing a communication connection to the vehicle 100, for example, a smart car key or a wearable device like a smartwatch. In this case, in the smart car key or the wearable device like the smartwatch, sensors such as an acceleration sensor and a gyroscope sensor is built to detect a motion track of the smart car key or the wearable device, and a communication module like a Bluetooth module is also built to establish a communication connection to the vehicle 100 and send motion track information of the smart car key or the wearable device to the vehicle 100.

In addition, it can be seen from the above description that this embodiment provides the human-machine interaction method for implementing interaction between a user and a vehicle, the related vehicle control apparatus 10, the vehicle control method (as shown in FIG. 5A-1 and FIG. 5A-2) performed by the vehicle control apparatus 10, a vehicle-mounted computer device as the vehicle control apparatus 10, a computer-readable storage medium of the computer device, and a computer program stored in the computer-readable storage medium. When the computer program is executed by a processor, a function of the vehicle control apparatus 10 is implemented, and the method procedure shown in FIG. 5A-1 and FIG. 5A-2 is performed. In addition, the vehicle control apparatus is also an example of a human-machine interaction apparatus. Therefore, in other words, this embodiment further provides the human-machine interaction apparatus. In addition, the processing shown in FIG. 5A-1 and FIG. 5A-2, and FIG. 5B may also be considered as recognition on the gesture action, and is used to recognize whether the gesture action recognized by the optical sensor is the gesture action of the valid user. Therefore, in other words, this embodiment provides a gesture recognition method and a gesture recognition apparatus.

Embodiment 2

The following describes Embodiment 2 of this application.

This embodiment relates to a method for summoning a vehicle by using a gesture action of a user.

Figure 9:
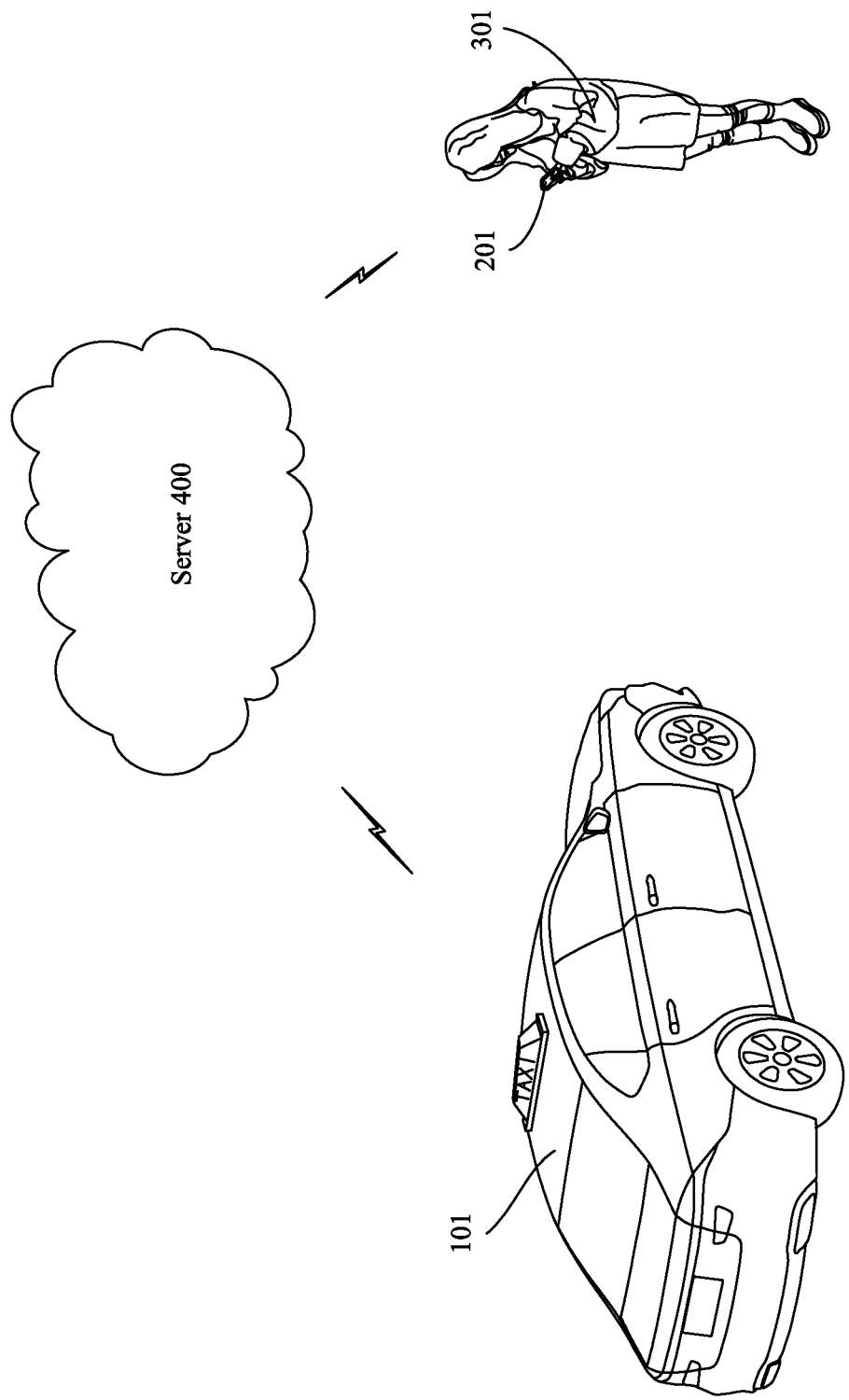
FIG. 9 is an explanatory diagram of a taxi hailing scenario according to an embodiment of this application.

Specifically, in this embodiment, refer to FIG. 9. A user 301 operates taxi hailing software on a smartphone 201 to reserve a robotaxi (Robotaxi) via a cloud server 400. In this case, the smartphone 201 sends location information of the smartphone 201 to the cloud server 400 via a communication network. After performing scheduling, the cloud server 400 selects a vehicle 101 that serves as the robotaxi, and sends the location information of the smartphone 201 to the vehicle 101 via the communication network. The vehicle 101 travels to the user 301 based on the location information. When arriving near the user 301 (for example, 100 meters or tens of meters from the user), the vehicle 101 wants to know an accurate location of the user 301 to provide a more detailed service, for example, accurately stop at the location (next to) of the user 301. However, sometimes a location sent by the smartphone 201 has a specific deviation. Therefore, the accurate location of the user 301 cannot be obtained based on the location sent by the smartphone 201.

Therefore, in this embodiment, the vehicle 101 sends a message to the smartphone 201 of the user 301 via the cloud server 400, to request the user 301 to perform a predefined gesture action or any gesture action by using a hand holding the smartphone 201. Then, the user 301 performs a gesture action by using the hand holding the smartphone 201. In this case, in one aspect, the smartphone 201 obtains, through detection, terminal track information indicating a motion track of the smartphone 201, and sends the terminal track information to the cloud server 400; and in another aspect, the vehicle 101 obtains, by using detection information of a vehicle-mounted camera or the like, gesture action information indicating the gesture action of the user 301, and sends the gesture action information to the cloud server 400. Then, the vehicle 101 compares the motion track information received from the smartphone 201 with the gesture action information detected by using the vehicle-mounted camera, to determine whether the two are matched, and sends a determining result to the vehicle 101. When the determining result is "the two are matched", the vehicle 101 determines the user 301 as a target passenger, continuously tracks the user 301 by using a visual tracking technology of an optical sensor (like a camera or a millimeter wave radar), and travels to the user 301 by using an autonomous driving function. Therefore, for example, the vehicle 101 can stop at the location of the user 301, and a detailed service is provided. In this case, the meaning of the predefined gesture action or any gesture action of the user 301 may be understood as "authenticate me as a valid user". Therefore, correspondingly, the vehicle 101 executes, based on the gesture action, control for authenticating the user 301 as a valid user. The control for authenticating the user as a valid user herein is an example of the first control in this application.

The following describes this embodiment in more detail with reference to FIG. 10 to FIG. 18.

Figure 10:
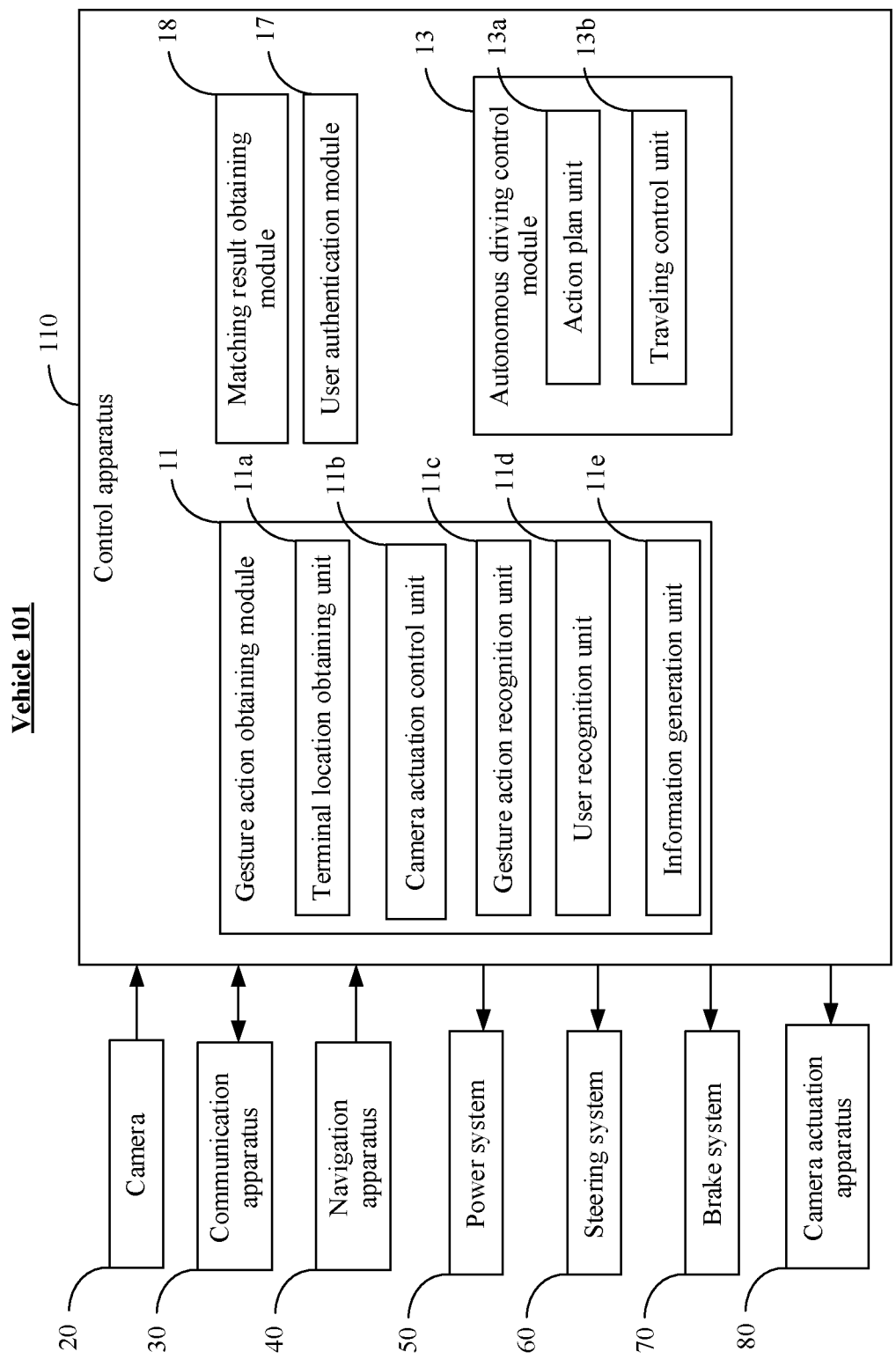
FIG. 10 is a block diagram of a structure of a vehicle according to an embodiment of this application.

First, a related structure of the vehicle 101 is described with reference to FIG. 10.

By comparing the structure of the vehicle 101 shown in FIG. 10 with the structure of the vehicle 100 shown in FIG. 2, a main difference is as follows: the gesture matching module 12, the terminal ID authentication module 14, the terminal track obtaining module 15, and the instruction recognition module 16 in the vehicle 100 are not included, but a matching result obtaining module 18 for obtaining a matching result from the cloud server 400 is provided. The other structure is the same as that of the vehicle 100, the same reference numerals are used for the same structure, and detailed description thereof is omitted.

In this embodiment, the vehicle 101 does not perform matching for determining whether a gesture action matches a terminal track. The matching is performed by the cloud server 400. After performing the matching, the cloud server 400 sends, to the vehicle 101, information indicating the matching result.

Figure 11:
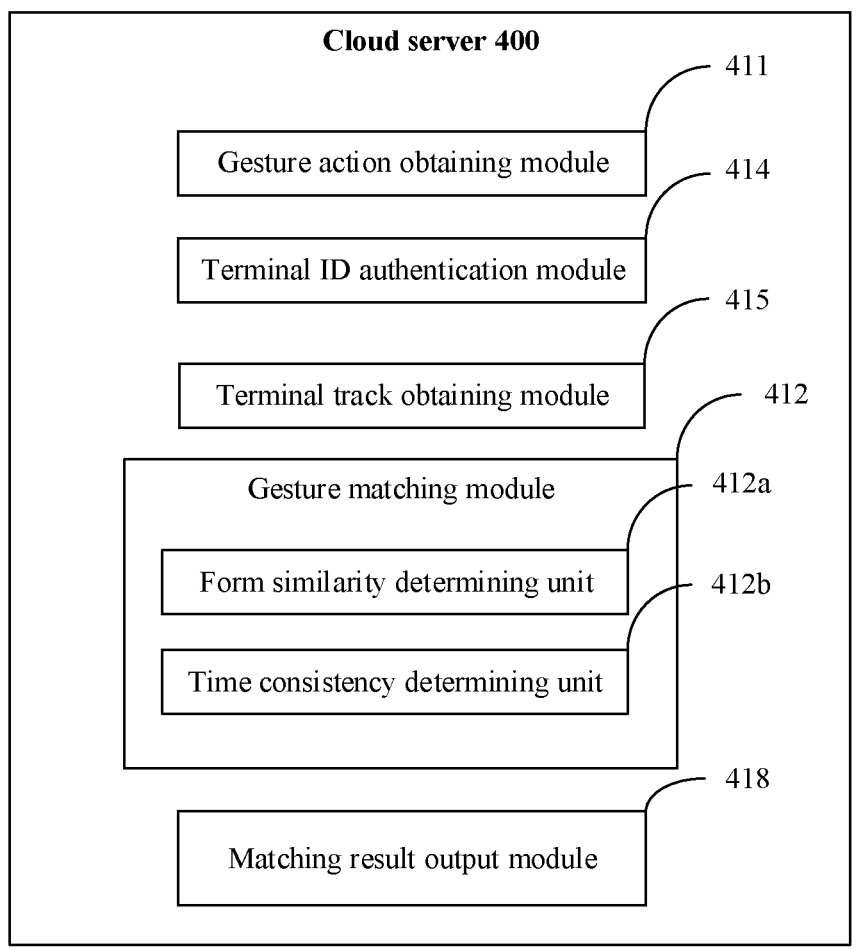
FIG. 11 is a block diagram of a structure of a cloud server according to an embodiment of this application.

The following briefly describes a related structure of the cloud server 400 with reference to FIG. 11.

As shown in FIG. 11, the cloud server 400 is a computer that has a processor and a memory. The memory stores program instructions. When the program instructions are executed by the processor, functions of corresponding functional modules are implemented. These functional modules include at least a gesture action obtaining module 411, a terminal ID authentication module 414, a terminal track obtaining module 415, a gesture matching module 412, and a matching result output module 418. In addition, typically, the cloud server 400 further has a wireless communication unit (that is not shown in the figure), and can perform wireless communication with the vehicle 101 and the smartphone 201 via the wireless communication unit.

The gesture action obtaining module 411 is configured to obtain the gesture action information from the vehicle 101 via the wireless communication unit, where the gesture action information is obtained by the vehicle 101 via a sensor like the vehicle-mounted camera.

The terminal ID authentication module 414 is configured to authenticate ID information of a mobile terminal. When ID information of the smartphone 201 is received, because the smartphone 201 is a registered user (terminal) of the taxi hailing software, an ID of the smartphone 201 is authenticated as valid.

The terminal track obtaining module 415 is configured to obtain, via the wireless communication unit, terminal track information from a mobile terminal whose ID is authenticated as a valid ID, namely, the smartphone 201. The terminal track information is obtained by the smartphone 201 via an acceleration sensor and/or a gyroscope sensor of the smartphone 201, and indicates the motion track of the smartphone 201.

The gesture matching module 412 is configured to compare the gesture action information obtained by the gesture action obtaining module 411 with the terminal track information obtained by the terminal track obtaining module 415, to determine whether the two are matched. Specifically, the gesture matching module 412 includes a form similarity determining unit 412a and a time consistency determining unit 412b.

The form similarity determining unit 412a is configured to: determine whether a similarity exists between a form of a gesture action and a form of a motion track of the mobile terminal, for example, when the similarity reaches above a specified similarity degree or a predefined similarity threshold, determine that the similarity exists. The form similarity determining unit 412a may use a preset template to compare with the motion track and the gesture action, to determine whether the form of the gesture action is similar to the form of the motion track of the mobile terminal, or matching determining may be performed by using a trained track matching model. The track matching model may be obtained by using a motion track of a smart terminal captured when a user performs a predefined gesture action by using a hand holding the smart terminal and a user gesture action captured by a camera as samples to train a CNN (Convolutional Neural Network, convolutional neural network) model or an MLP (Multi-layer perceptron, multi-layer perceptron) model.

The time consistency determining unit 412b is configured to: determine whether consistency exists between time of the gesture action and time of the motion track, for example, when the consistency reaches above a specified consistency threshold, determine that the consistency exists.

In this embodiment, when a determining result of the form similarity determining unit 412a is: "the similarity exists", and a determining result of the time consistency determining unit 412b is: "the consistency exists", the gesture matching module 412 determines that the gesture action information matches the motion track information.

The matching result output module 418 is configured to output, to a vehicle, namely, the vehicle 101, via the wireless communication unit, matching determining result information indicating a determining result of the gesture matching module 412.

In this embodiment, gesture matching for determining whether the gesture action information matches the motion track information is performed by the server 400. In this way, a processing load on a vehicle side can be reduced. In addition, because the processing capability of the cloud server 400 is stronger than that of the vehicle, the processing speed can be improved.

Figure 12:
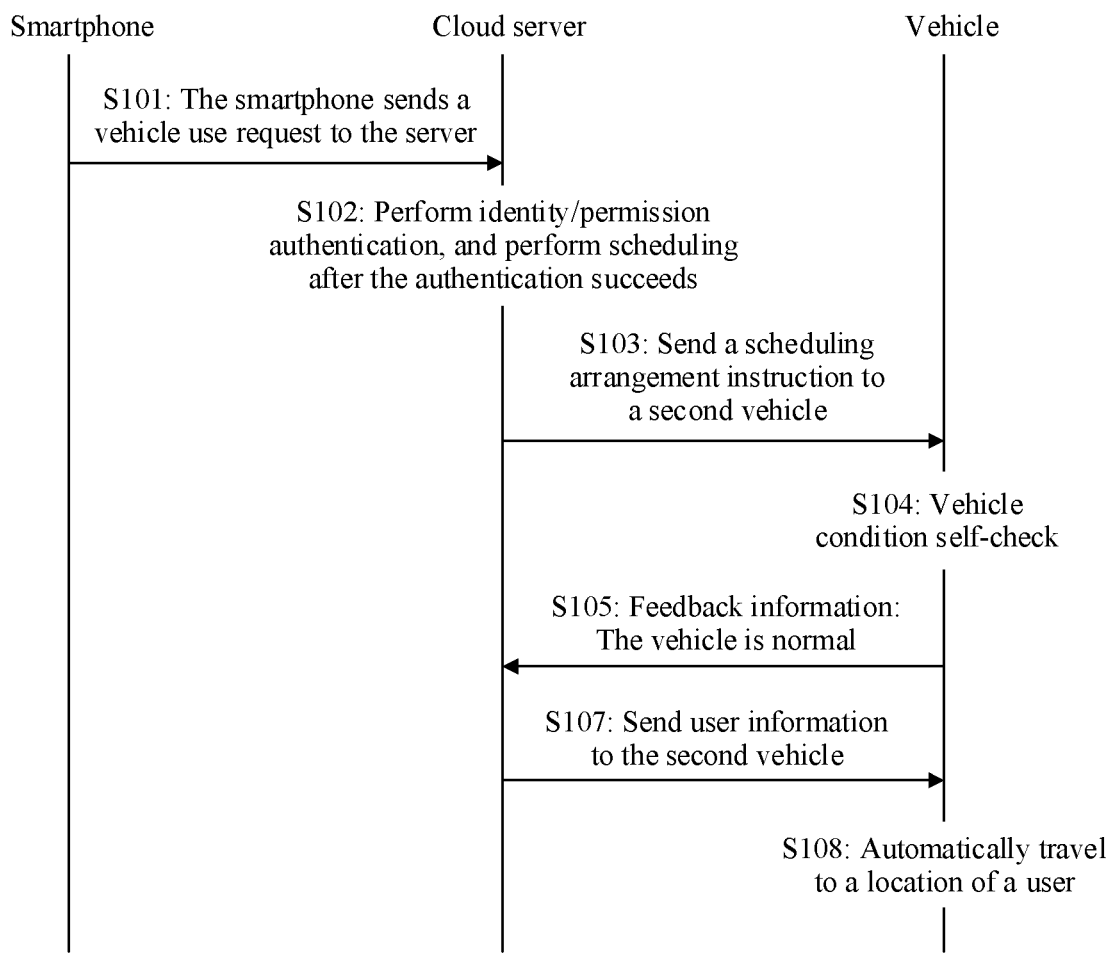
FIG. 12 is an explanatory diagram of a process in which a user reserves a vehicle by using a smartphone according to an embodiment of this application.

FIG. 12 is an explanatory diagram of an interaction process in which a user reserves a taxi by using a smartphone. The following describes, with reference to FIG. 12, a procedure in which the user 301 reserves a taxi, namely, a so-called "taxi hailing" procedure.

As shown in FIG. 12, in step S101, the user 301 sends a vehicle use request to the cloud server 400 by using the smartphone 201, and simultaneously sends location information and ID information of the smartphone 201 to the cloud server 400.

In step S102, the cloud server 400 performs identity and/or permission authentication based on the ID information of the smartphone 201. After the authentication succeeds, the cloud server 400 performs scheduling on an appropriate vehicle like the vehicle 101 selected from a plurality of vehicles.

In step S103, the cloud server 400 sends scheduling arrangement information to the selected vehicle 101.

In step S104, after receiving the scheduling instruction, the vehicle 101 performs self-check on a condition of the vehicle 101.

In step S105, when there is no problem in the self-check, the vehicle 101 sends, to the cloud server 400, feedback information indicating that the vehicle is normal.

In step S106, after receiving the feedback information indicating that the vehicle 101 is normal, the cloud server 400 sends a vehicle arrangement success message to the smartphone 201, and sends information (for example, a license plate number) of the vehicle 101 to the smartphone 101.

In step S107 that is in parallel with step S106, the cloud server 400 sends, to the vehicle 101, user information indicated by terminal location information and terminal ID information.

In step S108, after receiving the foregoing user information sent by the cloud server 400, the vehicle 101 activates the autonomous driving function, and autonomously travels, based on the terminal location information, to a location within a specified range (for example, 100 meters or tens of meters) from a terminal location, namely, near a pick-up location.

Figure 13:
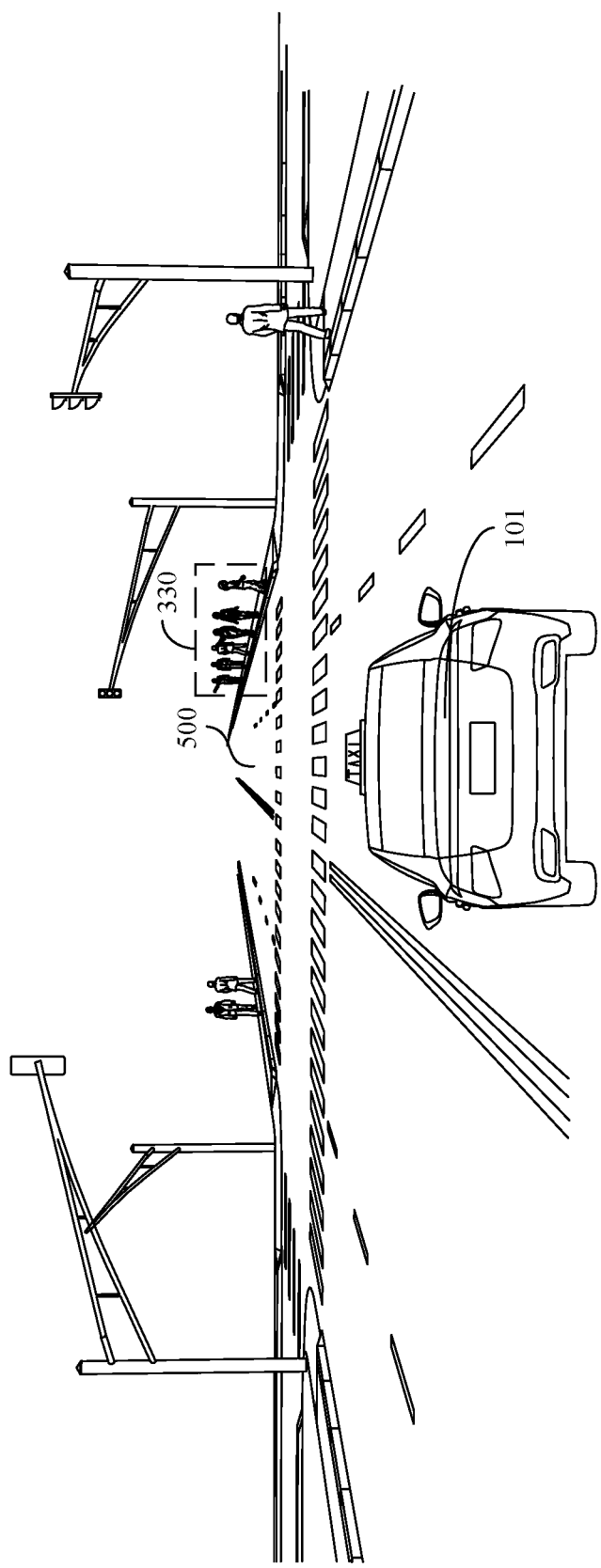
FIG. 13 is an explanatory diagram of a scenario in which a vehicle recognizes a user near a pick-up location of the user according to an embodiment of this application.

When the vehicle 101 travels near the pick-up location, for example, as shown in FIG. 13, a crowd 330 exists on a roadside of a lane 500 on which the vehicle 101 travels, and the crowd 330 includes the user 301. In this case, to obtain an accurate location of the user 301 or recognize the user 301 in the crowd 330, the vehicle 101 requests the user 301 to perform interaction as shown in FIG. 15.

Figure 15:
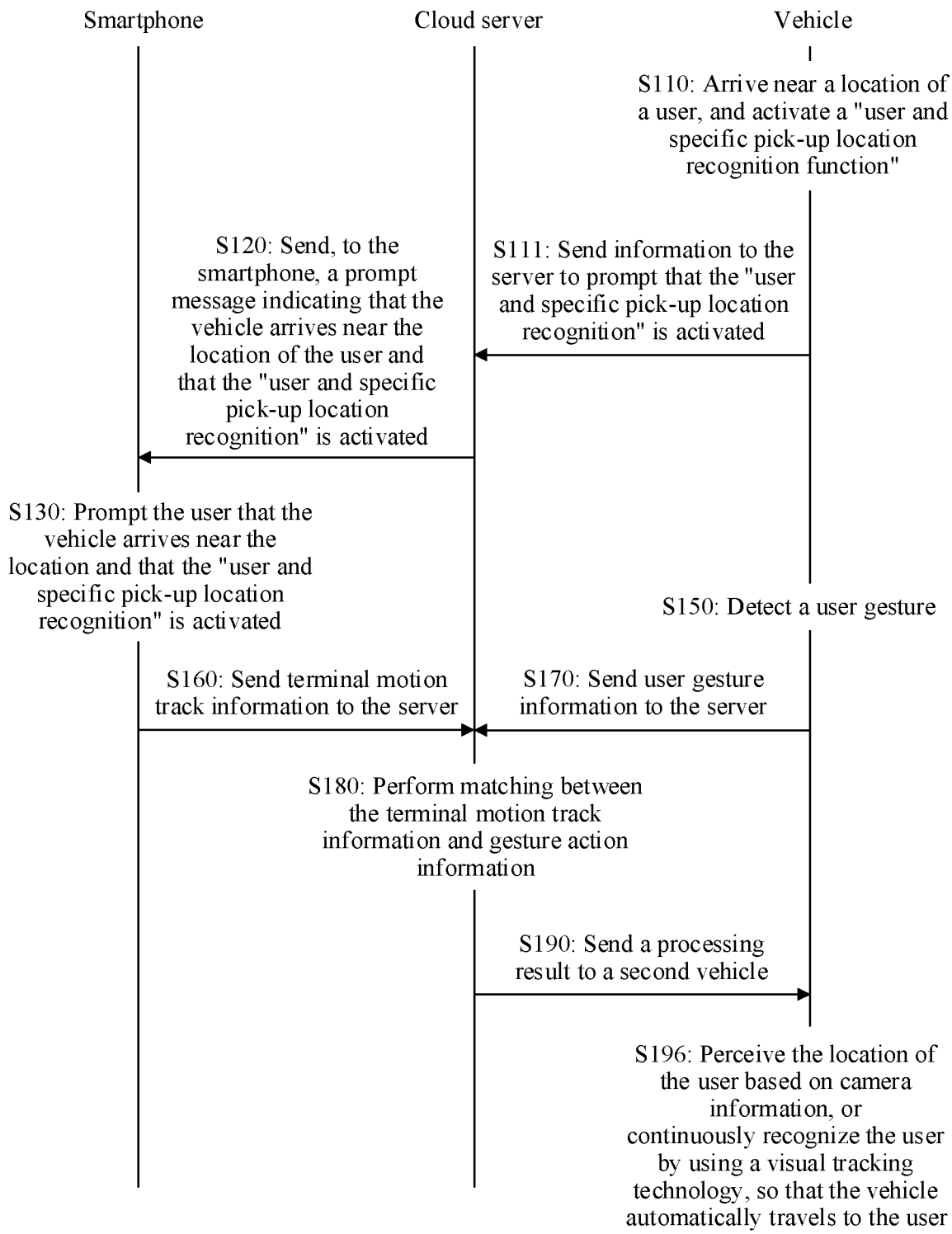
FIG. 15 is an explanatory diagram of a process in which a user interacts with a vehicle by using a smartphone near a pick-up location of the user according to an embodiment of this application.

Specifically, as shown in FIG. 15, in step S110, when the vehicle 101 determines, based on the terminal location information of the smartphone 201, that the vehicle 101 travels within a specified range from the user 301, namely, that the vehicle 101 arrives near the pick-up location, a "user and specific pick-up location recognition function" is activated. Specifically, for example, if the camera 20 is not started at this time, the camera 20 is started, and whether an orientation of the camera 20 needs to be adjusted is determined based on the terminal location information of the smartphone 201, so that the vehicle-mounted camera 20 can be used to recognize the user 301. The "specified range" herein may be, for example, a range of 100 meters or tens of meters from the location of the smartphone 201, and may be specifically set based on a detection range of a sensor like the vehicle-mounted camera 20. After step S110, step S111 is performed.

In step S111, the vehicle 101 sends, to the cloud server 400, information indicating that the "user and specific pick-up location recognition function" is activated.

In step S120, when receiving the message, the cloud server 400 sends information to the smartphone 201, to notify the user 301 that the vehicle 101 arrives near the pick-up location and that the "user and specific pick-up location recognition function" is activated.

In step S130, the smartphone 201 receives the message sent by the cloud server 400, for example, displays prompt information on a display or plays a voice via a speaker, to notify the user 301 that the vehicle 101 arrives near the pick-up location and that the "user and specific pick-up location recognition function" is activated.

After seeing the prompt information on the display or hearing the voice played by the speaker, the user 301 performs a gesture action, for example, waves, by using the hand holding the smartphone 201 toward a direction in which the vehicle 101 travels.

Figure 14:
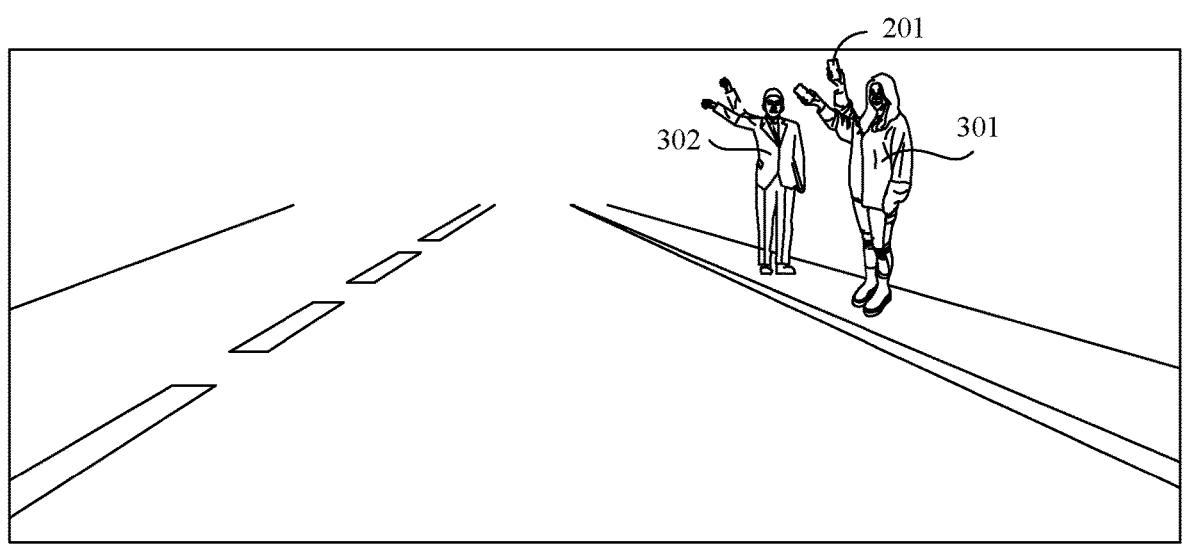
FIG. 14 shows an example of an image shot by a vehicle-mounted camera in the scenario shown in FIG. 13.

In this case, in step S150, the vehicle 101 can obtain, via the vehicle-mounted camera 20, an environment image around the user 301, for example, an image shown in FIG. 14. FIG. 14 is the environment image around the user 301 that includes the user 301 and that is shot by the camera 20. For ease of description, for the crowd 330 in FIG. 13, only the user 301 and another user 302 are shown in FIG. 14. At this time, the vehicle 101 can detect, based on the environment image shot by the camera 20 (or based on detection information of another sensor like a millimeter wave sensor), the user 301 and the gesture action performed by the user 301. However, as shown in FIG. 14, there is the another user 302, near the user 301, who wants to take a taxi. When the another user 302 sees the vehicle 101 serving as a taxi, the another user 302 does not know that the vehicle 101 is reserved by the user 301, and therefore also performs a waving action to summon the vehicle 101. In this case, the vehicle 101 detects not only the gesture action of the user 301, but also the gesture action of the another user 302.

Therefore, the vehicle 101 cannot accurately recognize the user 301 only based on gesture action information.

Therefore, in this embodiment, in step S170, the vehicle 101 sends detected gesture action information about the user 301 and detected gesture action information about the another user 302 to the cloud server 400.

In addition, when the user 301 performs the gesture action by using the hand holding the smartphone 201, the smartphone 201 obtains the terminal track information indicating the motion track of the smartphone 201 through detection by using an acceleration sensor and/or a gyroscope sensor of the smartphone 201.

Then, in step S140, the smartphone 201 sends the obtained terminal track information to the cloud server 400.

In step S180, the cloud server 400 compares the received gesture action information with the terminal track information, to determine whether the two are matched. A specific determining method may be consistent with that in the foregoing embodiment (refer to FIG. 5B), and detailed description thereof is omitted herein.

In a scenario shown in FIG. 14, there are two pieces of gesture action information, namely, the gesture action information of the user 301 and the gesture action information of the another user 302. Because the smartphone 201 moves along with the hand (or an arm) of the user 301, the gesture action information of the user 301 actually matches the terminal track information of the smartphone 201 (form similarity and time consistency are good). Therefore, the cloud server 400 determines that the gesture action information of the user 301 matches the terminal track information, but determines that the gesture action information of the another user 302 does not match the terminal track information.

In step S190, after completing the gesture matching, the cloud server 400 sends, to the vehicle 101, information indicating a gesture matching result.

In step S196, the vehicle 101 receives the gesture matching result sent by the cloud server 400, and authenticates the user 301 as a valid user based on the gesture matching result. The "authenticating the user 301 as a valid user" means to authenticate the "user 301" in information obtained from a sensor like the camera 20 as a valid user, or authenticate information about the user 301 obtained from a sensor like the camera 20 as valid user information. Subsequently, the vehicle 101 continuously recognizes the user 301 based on the detection information of the sensor like the camera 20 by using the visual tracking technology, and based on this, travels to the user 301 by using the autonomous driving function. Alternatively, the vehicle 101 accurately recognizes, based on the detection information of the sensor like the camera 20, a location of the user 301, and based on this, travels to the user 301 by using the autonomous driving function.

According to this embodiment, for example, as shown in FIG. 14, when there are more than two users, namely, the user 301 and the another user 302, at the pick-up location, and the more than two users each perform a gesture action, the gesture action information is compared with the motion track information of the smartphone 201, to determine whether the gesture action information matches the motion track information of the smartphone 201. The user 301 can be accurately recognized as a valid user or a specific pick-up location of the user 301 can be accurately recognized. That is, by using this embodiment, effective human-machine interaction can be performed even if facial recognition is not performed.

In addition, the scenario shown in FIG. 14 is merely an example. However, sometimes there may be no another user near the user 301. In this case, the vehicle 101 detects only one gesture action, and therefore, only gesture action information about one gesture action is sent to the cloud server 400. Alternatively, sometimes a plurality of other users perform a gesture action near the user 301. In this case, the vehicle 101 may send all detected gesture action information to the cloud server 400.

Figure 16:
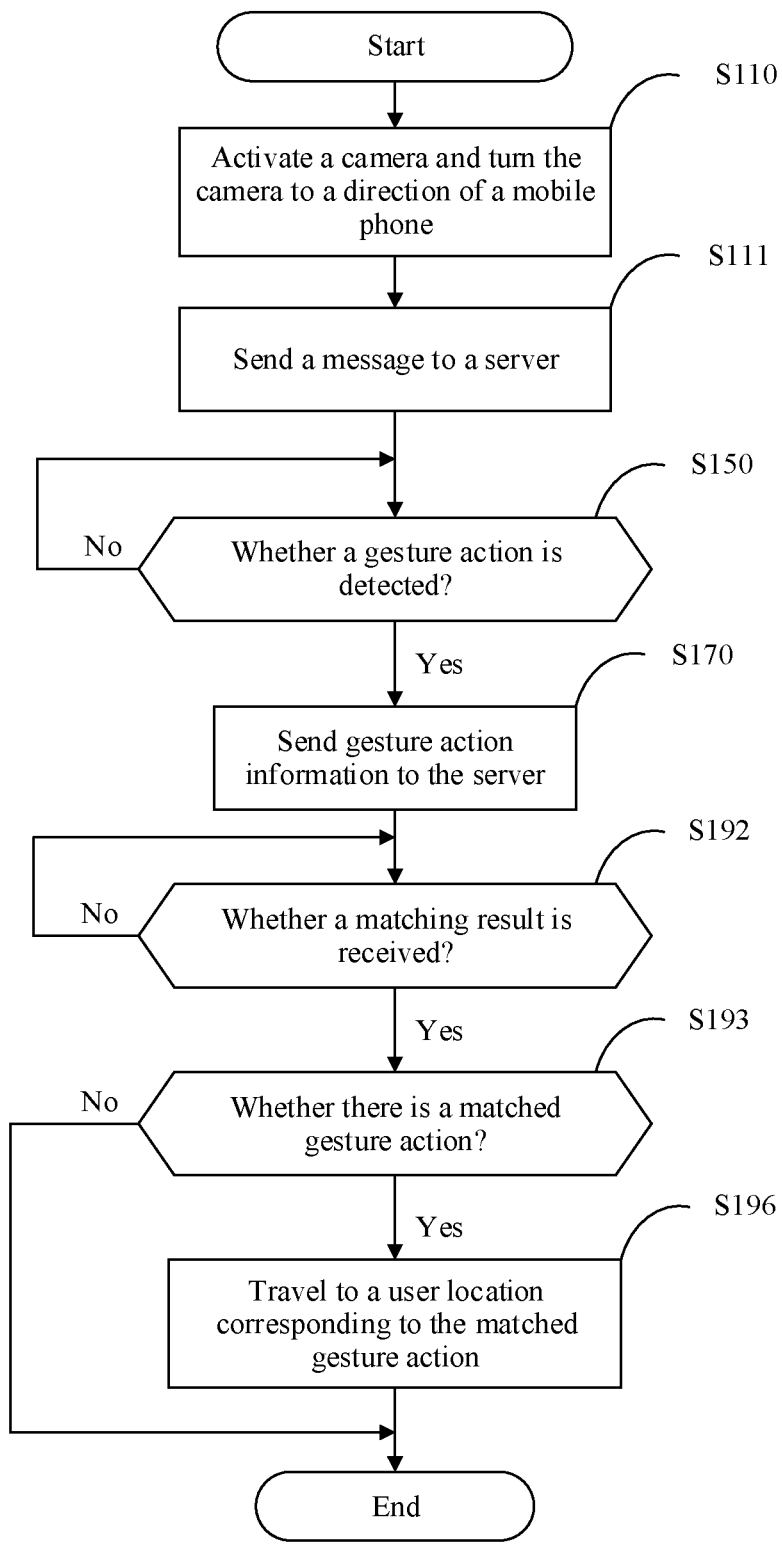
FIG. 16 is a flowchart of processing performed on a vehicle side in the interaction process shown in FIG. 15.
Figure 17:
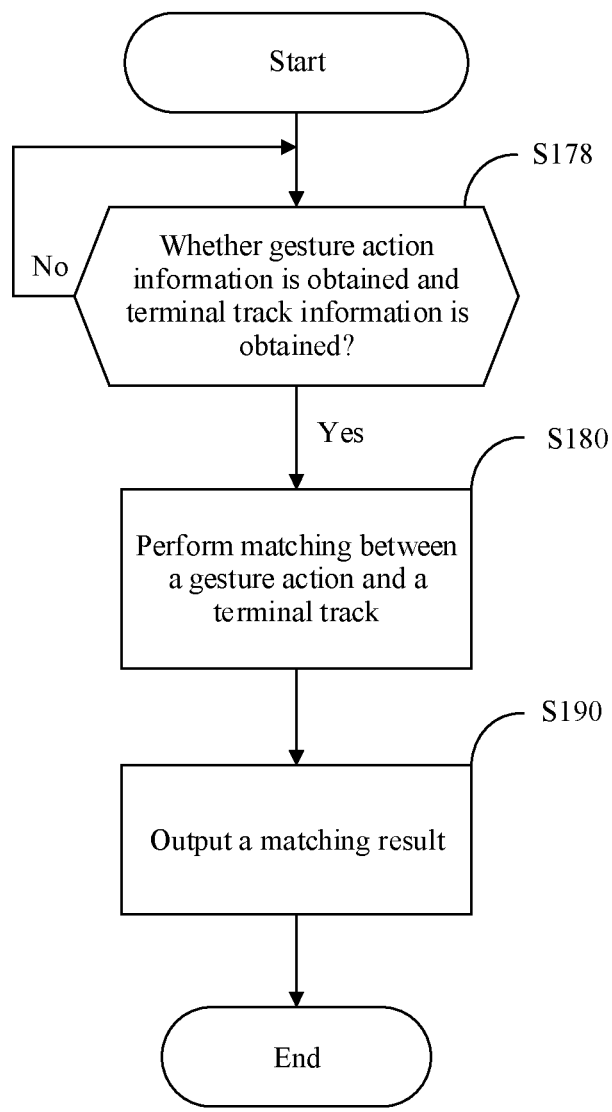
FIG. 17 is a flowchart of processing performed on a cloud server side in the interaction process shown in FIG. 15.

The following separately describes a processing procedure on a side of the vehicle 101 and a processing procedure on a side of the cloud server 400 during interaction with reference to FIG. 16 and FIG. 17, to describe this embodiment in more detail.

First, the processing procedure on the side of the vehicle 101 is described with reference to FIG. 16.

As shown in FIG. 16, when the vehicle 101 arrives near the pick-up location, in step S110, the camera 20 is activated, and whether the orientation of the camera 20 needs to be adjusted is determined. When it is determined that the orientation of the camera 20 needs to be adjusted, the orientation of the camera 20 is adjusted, so that a detection range of the camera 20 covers the location of the user 301, and the user 301 can be well detected.

Then, in step S111, the vehicle 101 sends, to the cloud server 400, the information indicating that the "user and specific pick-up location recognition function" is activated.

Subsequently, in step S150, the vehicle 101 monitors whether the gesture action is detected, and when the gesture action is detected, step S170 is performed.

In step S170, the vehicle 101 sends the obtained gesture action information to the cloud server 400.

Next, in step S192, whether the gesture matching result sent by the cloud server 400 is received is monitored. When the gesture matching result is received, step S193 is performed. In step S193, whether the gesture matching result indicates that there is gesture action information matching the terminal track information is determined; if yes, step S196 is performed; if no, it is considered that recognition on the gesture action of the user 301 fails; and in this case, because the vehicle 101 may travel to a location close to the user 301, the user 301 is no longer required to perform the gesture action, and this processing ends. In addition, in this case, the vehicle 101 may continue traveling to the user 301 based on the terminal location information.

In addition, when a determining result in step S193 indicates that there is the gesture action information matching the terminal track information, in step S196, the vehicle 101 travels to the location of the user 301 based on recognition performed by the sensor like the camera 20 on the user 301.

The following describes the processing procedure on the side of the cloud server 400 when the user 301 interacts with the vehicle 101 with reference to FIG. 17.

As shown in FIG. 17, in step S178, the cloud server 400 monitors whether the gesture action information is obtained from the vehicle 101 and whether the terminal track information is obtained from the smartphone 201. When the gesture action information and the terminal track information are obtained, step S180 is performed.

In step S180, whether the gesture action information matches the terminal track information is determined. The processing for determining whether the gesture action information matches the terminal track information may be consistent with that in the foregoing embodiment (refer to FIG. 5B), and detailed description thereof is omitted herein.

When the gesture matching in step S180 is completed, step S190 is performed, and a determining result is output. Herein, as described in the foregoing embodiment, when there are a plurality of gesture actions, in a final output determining result, only one gesture action matches the terminal track. For example, when it is determined that time consistency between the plurality of gesture actions and the terminal track is greater than a predefined consistency threshold, and all form similarities between the plurality of gesture actions and the terminal track are greater than a predefined similarity threshold, further processing is performed, to determine a specified gesture action that is in the plurality of gesture actions and that has the highest time consistency with the terminal track or the highest form similarity with the terminal track; and then the specified gesture action is determined as a final gesture action that successfully matches the terminal track.

As described above, in this embodiment, when the vehicle 101 travels near the pick-up location, the vehicle 101 sends information to the smartphone 201 of the user 301, to request the user 301 to perform a gesture action. After learning content of the information, the user 301 performs the gesture action by using the hand holding the smartphone 201. In this case, in one aspect, the vehicle 101 obtains the gesture action information of the user 301 through detection by using the sensor like the camera 20, and sends the gesture action information to the cloud server 400. In another aspect, when moving along with the hand of the user 301, the smartphone 201 performs detection by using the acceleration sensor, the gyroscope sensor, and/or the like of the smartphone 201 to obtain the motion track information of the smartphone 201, namely, the terminal track information, and sends the obtained terminal track information to the cloud server 400. When receiving the gesture action information and the terminal track information, the cloud server 400 determines whether the gesture action information matches the terminal track information, and sends a matching result to the vehicle 101. The vehicle 101 authenticates, as a valid user, the user 301 corresponding to the gesture action information that matches the terminal track information. Then, the location of the user 301 is recognized based on the detection information of the sensor like the camera 20, or visual tracking is performed on the user 301 to continuously recognize the user 301, so that the vehicle 101 can travel to an accurate location of the user 301.

In this way, according to this embodiment, whether the gesture action information is gesture action information about a valid user is determined by comparing the gesture action information with the terminal track information. Therefore, even if another person (for example, the another user 302 in FIG. 14) near the user 301 also performs a gesture action when the user 301 performs a gesture action, the vehicle 101 can accurately recognize the user 301 (and the gesture action thereof) as a valid user (and a valid gesture action). From a perspective of human-machine interaction, effective human-machine interaction can be implemented without facial recognition.

In addition, in this embodiment, a purpose of requiring the user 301 to perform a gesture action is to enable the vehicle 101 to authenticate the user as a valid user. Therefore, in this case, the gesture action performed by the user 301 is not limited, and may be any action instead of a predefined gesture action. However, in an example, the user 301 may alternatively be required to perform a predefined gesture action, for example, to "draw a circle" with a hand. However, compared with that in the another example, the manner in which the gesture action is not limited can prevent the user from feeling trouble, and can also prevent, for example, the user 301 from feeling embarrassed because of performing the predefined gesture action that is a "strange action" in the view of others in the crowd.

The following further describes some other examples of this embodiment.

In FIG. 12, a vehicle reservation manner in which a user reserves a robotaxi is provided. In addition, another manner may alternatively be used to implement vehicle reservation.

Figure 18:
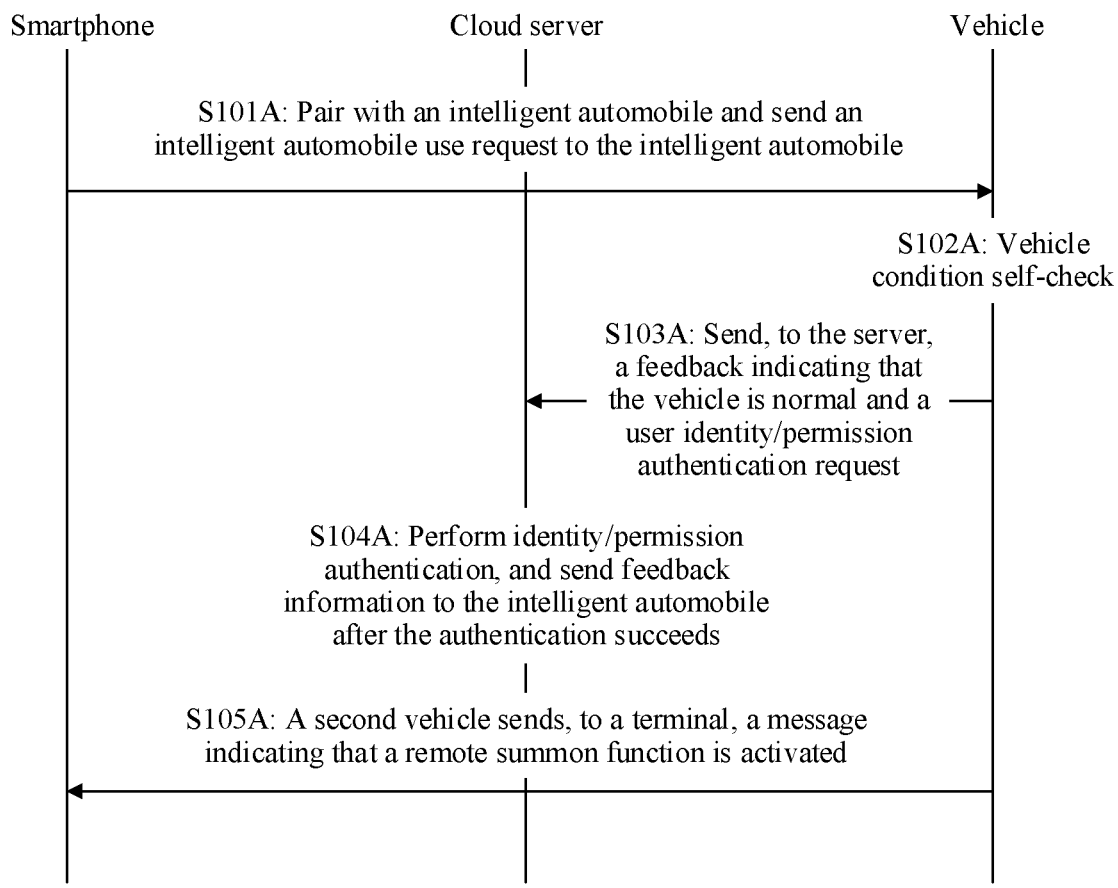
FIG. 18 is an explanatory diagram of a vehicle reservation manner according to an embodiment of this application.

For example, in FIG. 18, another vehicle reservation manner is provided. A scenario envisaged in the manner provided in FIG. 12 is: the user 301 is far away from the vehicle 101, for example, the user 301 is not within a coverage area of a vehicle-mounted network of the vehicle 101. However, a scenario envisaged in the manner provided in FIG. 18 is: the user 301 is close to the vehicle 101, and the user 301 can communicate with the vehicle 101. This scenario is, for example, a scenario in which a vehicle use request is sent to a vehicle by scanning a code during vehicle sharing.

Specifically, refer to FIG. 18. In step S101A, the smartphone 201 of the user 301 establishes a communication connection to the vehicle 101, sends vehicle use request information to the vehicle 101, and sends the terminal ID information of the smartphone 201 to the vehicle 101.

In step S102A, after the vehicle 101 receives the vehicle use request information, the vehicle 101 performs vehicle condition self-check.

In step S103A, when no problem is found in the self-check, the vehicle 101 sends, to the cloud server 400, information indicating that a vehicle condition is normal, sends the terminal ID information of the smartphone 201 to the cloud server 400, and requests to perform user identity/permission authentication based on the terminal ID information.

In step S104A, the cloud server 400 performs the user identity/permission authentication based on the received terminal ID information, and then sends an authentication result to the vehicle 101.

In step S105, when the vehicle 101 receives authentication result information sent by the cloud server 400, and the authentication result indicates that authentication on the terminal ID information succeeds, the vehicle 101 starts the camera 20, activates a user recognition function, and sends, to the smartphone 201, information indicating that "the user recognition function is activated". The subsequent processing is the same as step S150 to step S196 in FIG. 16.

In addition, in the foregoing description, the robotaxi is used as an example for description. However, this application is also applicable to a taxi with a driver and an online ride-hailing car, or an autonomous driving taxi in which a safety officer sits. At this time, after a control apparatus of the vehicle authenticates the user 301 as a valid user, a picture image or a video image may be displayed on a display of the vehicle (for example, a display of a navigation apparatus). The picture image or the video image is an image that is of an environment around the user 301 and that includes the user 301. An image of the user 301 is highlighted to prompt a driver that the user 301 is a valid user. In this highlighting manner, for example, the user 301 may be surrounded by using a rectangular line box, or all or a part of the image of the user 301 (for example, an image of the head) may be displayed in a magnified manner.

In addition, in the foregoing description, the cloud server 400 determines whether the gesture action information matches the terminal track information. However, in another example, a vehicle control apparatus of the vehicle 101 may alternatively perform the determining. In this case, the vehicle 101 receives the terminal track information from the cloud server 400, and compares the gesture action information detected by the vehicle with the terminal track information received from the cloud server 400, to determine whether the gesture action information matches the terminal track information.

Figure 19:
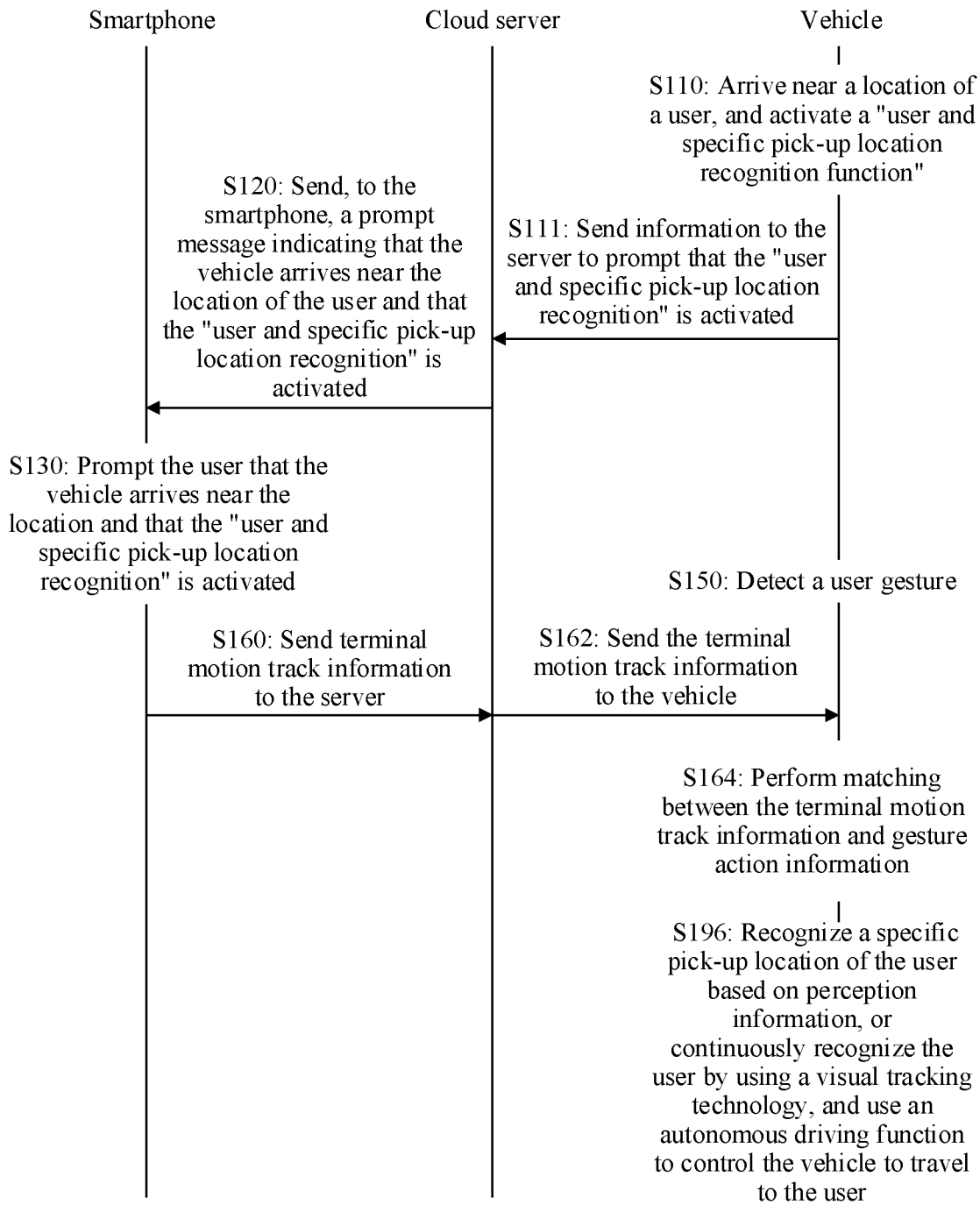
FIG. 19 is an explanatory diagram of another example of the interaction process shown in FIG. 15.

The following briefly describes the another example with reference to FIG. 19. By comparing content shown in FIG. 19 with that shown in FIG. 15, the processing before step S160 is the same as that shown in FIG. 19, and therefore, description of the same content is omitted.

As shown in FIG. 19, in step S162, when receiving terminal motion track information sent by the smartphone, the cloud server sends the terminal motion track information to the vehicle, and the vehicle compares the terminal motion track information with the gesture action information obtained in step S150, to determine whether the gesture action information matches the terminal track information. Next, in step S196, a user, namely, the user 301, corresponding to the gesture action information that matches the terminal track information is authenticated as a valid user, and then the vehicle is controlled to travel to the valid user.

In this embodiment, "control for enabling the vehicle 101 to travel to the location of the user 301 by using the visual tracking technology near the pick-up location" and "control of highlighting the image of the user 301 on the picture image" are both examples of the first control in this application.

Embodiment 3

This embodiment relates to a method for interaction between a user and a food delivery robot.

Recently, more and more restaurants use food delivery robots to deliver food. At this time, usually it is necessary to preset a location of a specific dining table, and then the food delivery robot can accurately deliver food. As a result, a customer cannot freely select a location, or cannot change the location after the location is selected.

In addition, sometimes a plurality of customers at a same dining table order separately, or some dining tables are long tables (that are common in fast-food restaurants). In this case, the robot cannot accurately distinguish which customer is the correct delivery object, and cannot provide a more detailed service (for example, facing the customer at the best angle). For example, if customers are asked to wave, a plurality of people may wave at the rush hour, causing the robot confused.

Therefore, this embodiment provides the method for interaction between a user and a food delivery robot. The following describes an application scenario of this embodiment with reference to FIG. 20.

Figure 20:
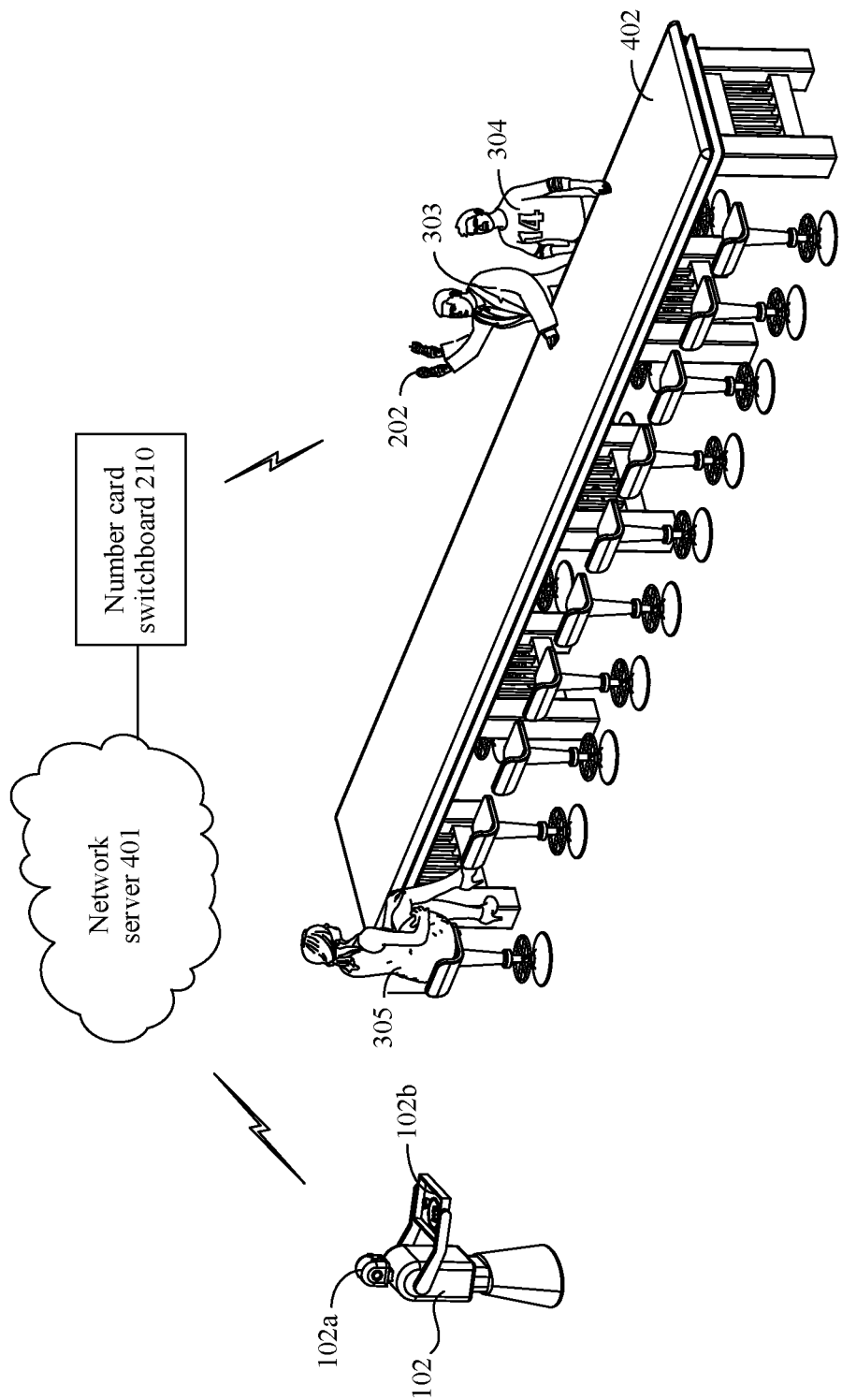
FIG. 20 is an explanatory diagram of a scenario in which a food delivery robot delivers food according to an embodiment of this application.

As shown in FIG. 20, on a restaurant side, a network server 401, electronic number cards 202, a number card switchboard 210, and a food delivery robot 102 are included as network elements.

The network server 401 is a server of a local area network of a restaurant. In this embodiment, the network server 401 further constitutes a computer device for food delivery distribution, for example, by automatically scheduling or receiving an operation instruction from an operator, the corresponding food delivery robot 102 is arranged to deliver food.

Each electronic number card 202 is provided with a different number identifier that can be observed by the customer. In addition, the electronic number card 202 as a mobile terminal further has a chip and a communication module like a Bluetooth module, and can establish a communication connection to the number card switchboard 210 through Bluetooth or the like. Furthermore, the electronic number card 202 is provided with an acceleration sensor and/or a gyroscope sensor, so that a motion track of the electronic number card 202 can be detected, to obtain motion track information.

The number card switchboard 210 corresponds to the plurality of electronic number cards 202, and establishes a communication connection to the electronic number cards 202 through Bluetooth or the like. In addition, the number card switchboard 210 establishes a communication connection to the network server 401 in a wired manner, a Wi-Fi manner, or the like.

The food delivery robot 102 has a built-in control unit and a travel system (a drive motor, wheels, and the like). In addition, the food delivery robot 102 has a head 102a, a camera (not shown in the figure) is disposed in the head 102a, and an ambient environment can be detected via the camera. Therefore, under the control of the control unit, the food delivery robot 102 can walk or move autonomously based on detection information obtained by detecting the ambient environment by the camera. In addition, the food delivery robot 102 is provided with a detachable dinner plate 102b, and food can be placed on the dinner plate 102b. Furthermore, in this embodiment, the food delivery robot 102 further has a loudspeaker (not shown in the figure) that can make a voice.

In addition, the food delivery robot 102 is further provided with a built-in communication unit, and can establish a communication connection to the network server 401 through Wi-Fi or the like, to receive a scheduling instruction from the network server 401, so as to deliver food to a corresponding customer.

In the scenario shown in FIG. 20, a long table 402 is disposed in the restaurant. There are three customers, namely, a customer 303, a customer 304, and a customer 305, in front of the long table 402. The customer 303 is a valid user in this embodiment. The customer 303 is given an electronic number card 202 by the restaurant service staff after ordering at an ordering table (not shown in the figure). Then, the customer 303 sits in any free location on the long table 402.

When the restaurant finishes preparing the food ordered by the customer 303, the food delivery robot 102 starts to deliver the food to the customer 303. At this time, the food delivery robot 102 does not know which customer is the customer 303 and which location the customer 303 sits in. Therefore, the food delivery robot 102 makes a voice via the loudspeaker, and content of the voice is, for example, "Customer XX, the food delivery robot is looking for you, hold the number card and wave", to indicate the customer 303 to perform a gesture action by using a hand holding the electronic number card 202. After hearing the voice, the customer 303 faces a direction of the food delivery robot 102 and performs a gesture action by using the hand holding the electronic number card. At this time, in one aspect, the food delivery robot 102 recognizes the customer 303 and the gesture action of the customer 303 via the camera; and in another aspect, the electronic number card 202 obtains, via the acceleration sensor and/or the gyroscope sensor, terminal motion track information indicating a motion track of the electronic number card 202, and sends the terminal motion track information to the network server 401 via the number card switchboard 210, and the network server 401 sends the terminal track information to the food delivery robot 102.

The food delivery robot 102 determines whether the gesture action information indicating the gesture action matches the terminal track information. A specific determining method may be the same as that in Embodiment 1 (refer to FIG. 5B), and detailed description thereof is omitted herein. When it is determined that the gesture action information matches the terminal track information, the food delivery robot 102 authenticates the customer 303 corresponding to the gesture action information as a valid user, autonomously moves to the location of the customer by using a visual tracking technology, and can accurately deliver the food to the customer in a posture facing the customer, implementing accurate food delivery and a refined service.

According to this embodiment, the food delivery robot 102 determines whether the customer is a valid user by determining whether the gesture action information matches the terminal track information about the electronic number card 202, so that the valid user can be accurately recognized. In a recognition process, there is no need to limit a sitting location of a customer, and the customer can freely choose the sitting location. In addition, even if there is another customer (like the customer 304) next to a customer (like the customer 303) that the food delivery robot 102 is looking for, and the another customer also perform a gesture action, the customer that the robot is looking for can also be recognized as a valid user. From the perspective of human-machine interaction, effective human-machine interaction can be performed without facial recognition.

In addition, in the foregoing description, although the food delivery robot 102 makes a voice to request the customer 303 to perform a hand-waving gesture action, the customer 303 may alternatively perform another hand-waving gesture action. In this case, the customer 303 can be authenticated as a valid user based on the gesture action information and the terminal track information.

In addition, in the foregoing embodiment, the determining whether the gesture action information matches the motion track information is performed by the food delivery robot, and may alternatively be performed by the network server 401 in the restaurant.

In addition, in this embodiment, an example in which the electronic number card serves as the mobile terminal is used for description. However, the mobile terminal may alternatively be a smartphone held by the customer. In this case, the smartphone needs to establish a communication connection to the network server 401, and send terminal track information indicating a motion track of the smartphone to the network server 401.

In addition, this embodiment is not only applicable to the restaurant, but also applicable to a warehouse with a mobile robot and the like.

Embodiment 4

As an example of a human-machine interaction method, this embodiment relates to a method for interaction between a user and a smart television.

With the gradual popularization of smart home, many smart televisions provide an air control function, and users can control the smart televisions by using gesture actions. However, when a plurality of people watch TV, if a plurality of people simultaneously perform gesture actions, the smart television cannot determine which gesture action needs to be performed, and therefore, it is difficult to perform effective human-machine interaction.

Therefore, this embodiment provides the method for interaction between a user and a smart television, to perform effective human-machine interaction.

Figure 21:
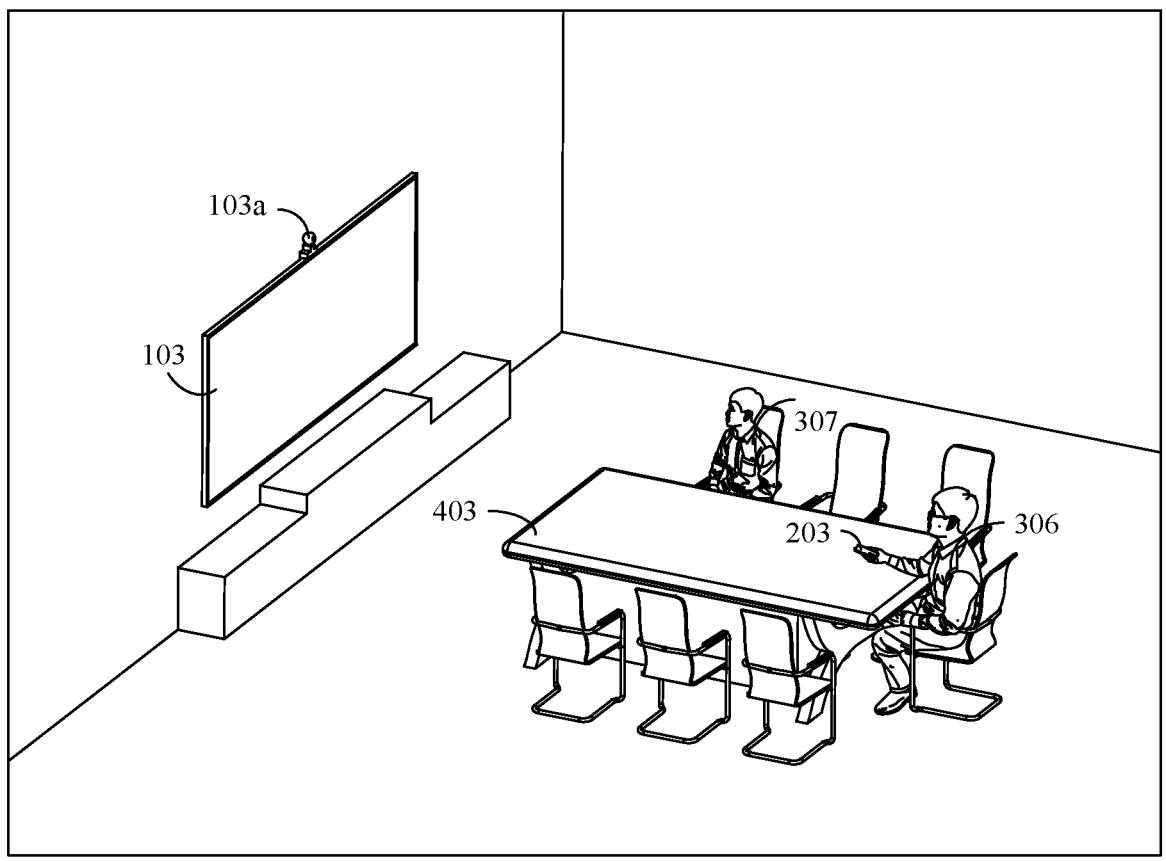
FIG. 21 is an explanatory diagram of a scenario in which air control is performed on a smart television according to an embodiment of this application.

Specifically, as shown in FIG. 21, a smart television 103 and a remote controller 203 matching the smart television 103 are disposed in a room, and an external camera 103*a* is connected to the smart television 103 through, for example, a USB (Universal Serial Bus, universal serial bus). The smart television 103 can detect a user in the room and a gesture action of the user via the camera 103*a*. In addition, certainly, the smart television 103 may alternatively have a built-in camera, and the built-in camera is configured to detect the user in the room and the gesture action of the user. It can be learned from this that, regardless of the external camera 103*a* or the built-in camera, the two types of cameras are essentially a part of the smart television 103, and are subordinate to the smart television 103. The remote controller 203 has a built-in communication module like Bluetooth, so that it can perform wireless communication with the smart television 103. In addition, the remote controller 203 has a built-in chip (a processor and a memory) and an acceleration sensor/gyroscope sensor, so that a motion track of the remote controller 203 can be detected, and terminal track information indicating the motion track of the remote controller 203 can be sent to the smart television 103.

In addition, a table 403 is placed in the room, and a viewer 306 and a viewer 307 sit around the table 403. The viewer 306 holds the remote controller 203 and is a valid user in this embodiment.

When an air control function of the smart television 103 needs to be used, the viewer 306 operates the remote controller 203 to activate the air control function of the smart television 103 (that can be triggered by pressing a dedicated button on the remote controller, or that can be triggered by performing a predefined operation on the remote controller, for example, pressing and holding a specified button, or that can be triggered by performing selection on an operation interface of a television display via the remote controller). In this case, the smart television 103 starts the camera 103*a*. Then, the viewer 306 performs any gesture action by using a hand holding the remote controller 203. The smart television 103 recognizes the viewer 306 and the gesture action of the viewer 306 via the camera 103*a*, to obtain gesture action information. In addition, the remote controller 203 detects the motion track of the remote controller 203 via the acceleration sensor/gyroscope sensor, and sends the motion track information indicating the motion track to the smart television 103. The smart television 103 determines whether the gesture action information matches the motion track information. When it is determined that the gesture action information matches the motion track information, the smart television compares the gesture action information with the motion track that is of the remote controller and that is received from the remote controller, to determine whether the gesture action information matches the motion track of the remote controller. When it is determined that the gesture action information matches the motion track of the remote controller, the viewer 306 corresponding to the gesture action information is authenticated as a user with air control permission, namely, a valid user. Next, a visual tracking technology is used to respond only based on the gesture action and/or other air operations such as eyeball operations of the viewer 306, and an air operation performed by another user like the viewer 307 is determined as invalid.

The smart television in this embodiment may be used in the home, or may be used in an office conference scenario.

In this case, a slideshow presentation or the like may be performed on the smart television.

According to this embodiment, the smart television 103 determines whether the viewer is a valid user by determining whether the gesture action information matches the terminal track information about the remote controller 203, to accurately recognize the valid user. In a recognition process, even if there are a plurality of viewers, a correct viewer (for example, the viewer 306) can be recognized as a valid user. From the perspective of human-machine interaction, effective human-machine interaction can be performed without facial recognition.

In the foregoing description, the remote controller 203 is used as an example of the mobile terminal. However, another mobile terminal like a smartphone may alternatively be used.

In the description of the foregoing embodiments, examples in which the vehicle, the smart television, and the food delivery robot serve as object devices are used for description. However, the human-machine interaction technology in this application may be further applied to a plurality of other scenarios in which air control is performed by using a gesture action or a scenario in which identity authentication is required.

Other Content

In addition to the foregoing embodiments of this application, this specification further discloses the following content.

Different from the technical concept of Embodiment 2, location sharing with a smartphone of a user may be requested in a robotaxi scenario, to accurately find a location of the user at a pick-up location.

Figure 22:
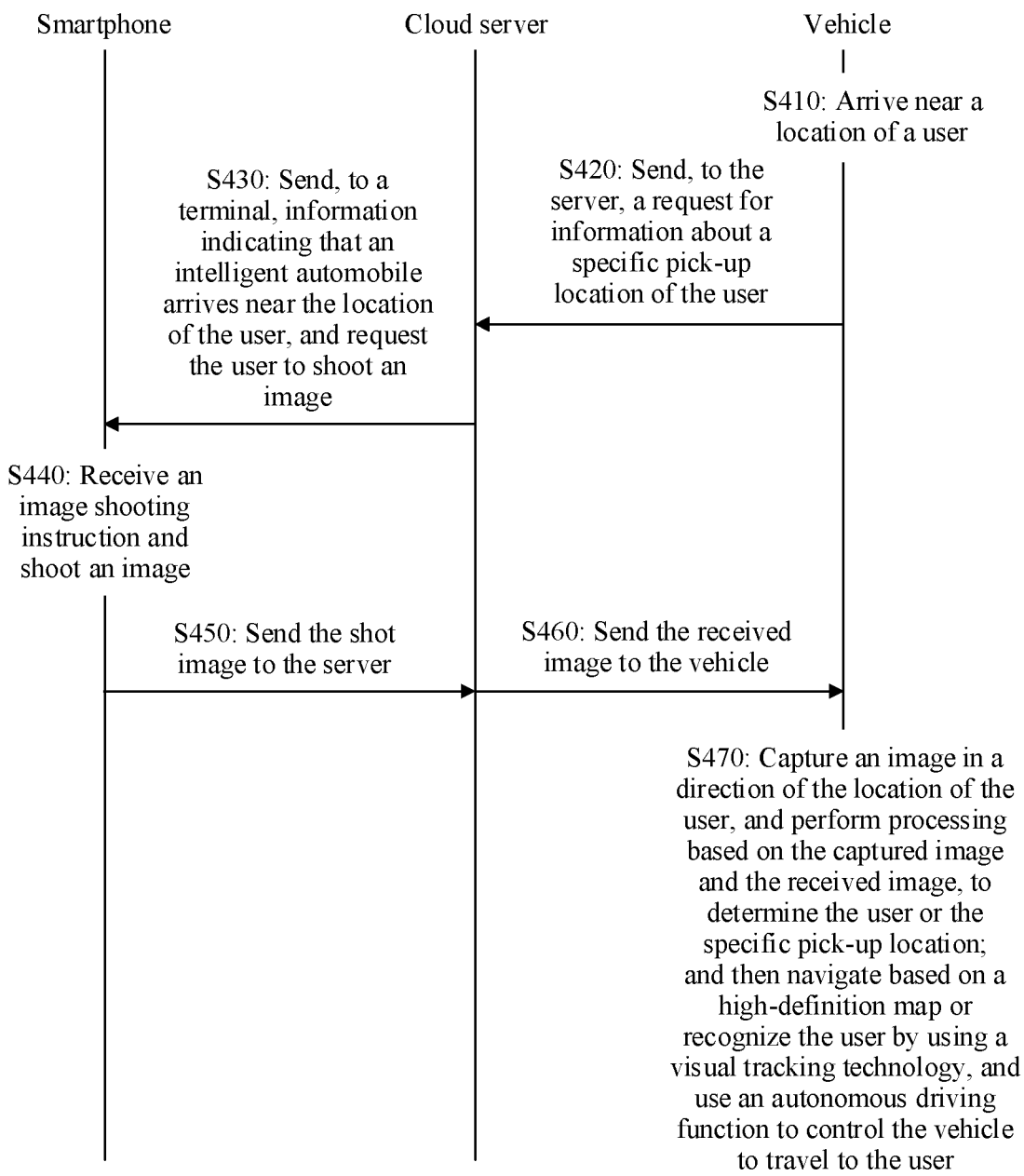
FIG. 22 is an explanatory diagram of a method for recognizing a specific location of a user by a vehicle according to this specification.

In addition, FIG. 22 provides a method for interaction between a vehicle and a user near a pick-up location, which is different from the technical concept of Embodiment 2. Specifically, sometimes, due to a weak satellite signal or the like, positioning information of the smartphone has a relatively large deviation. In this case, to search for the user or a specific pick-up location, the user may photograph an ambient environment by using the smartphone, and send a shot image to the vehicle via a server. The vehicle recognizes the user or the specific pick-up location based on information about the received image with reference to a high-definition map and an image shot by a vehicle-mounted camera.

The following performs further description with reference to FIG. 22.

As shown in FIG. 22, in step S410, the vehicle arrives near a location of the user. Subsequently, in step S420, the vehicle sends a request to the server to obtain information about the specific pick-up location. In step S430, when receiving the information, the server sends, to the smartphone, information indicating that the vehicle arrives near the location of the user and requests the user to photograph the ambient environment. After obtaining the information, the user uses the smartphone to photograph the ambient environment. Then, in step S440, the smartphone shoots an image and obtains image data. In step S450, the smartphone sends the image data to the server. In step S460, the server sends the received image data to the vehicle. In step S470, the vehicle captures an image in a direction of the location of the user via the vehicle-mounted camera, and performs image processing based on the captured image and an image received from the server, to determine the user and obtain the specific pick-up location. Then, navigation is performed based on a high-definition map, or the user is recognized by using a visual tracking technology, and the vehicle travels to the user by using an autonomous driving function.

Figure 23:
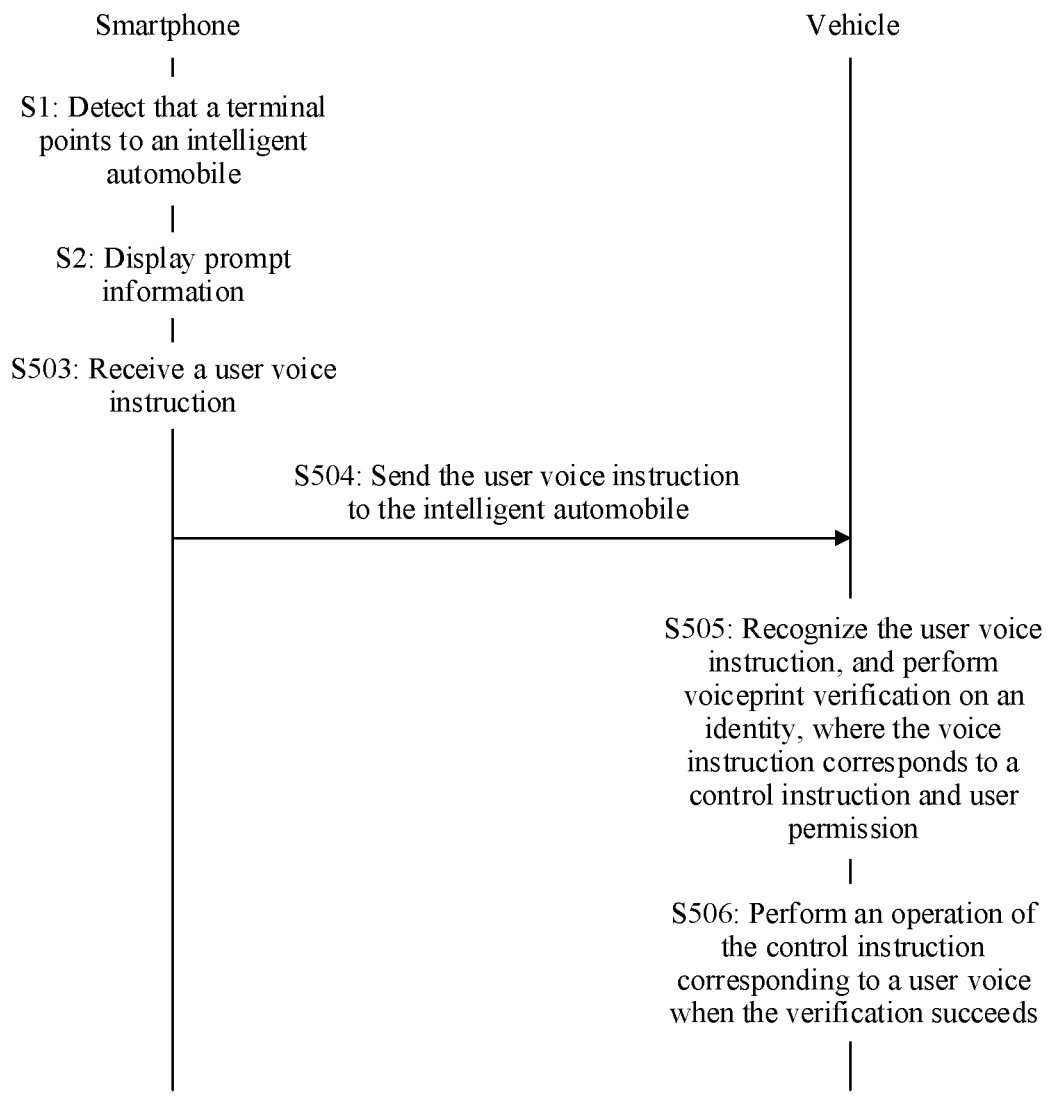
FIG. 23 is an explanatory diagram of a process in which a user controls a vehicle by using a voice according to this specification.

FIG. 23 provides a method for remotely controlling a vehicle, which is different from the technical concept of Embodiment 1. Specifically, in step S1, a smartphone detects that the smartphone points to the vehicle. Subsequently, in step S2, prompt information is displayed to notify a user that a connection to the vehicle is established. After obtaining content of the prompt information, the user sends a voice instruction to the smartphone, where the voice instruction is used to control the vehicle to make a corresponding response. Then, in step S503, the smartphone receives the voice instruction. Next, in step S504, the smartphone sends the voice instruction to the vehicle. In step S505, the vehicle receives the voice instruction, recognizes the voice instruction, and performs voiceprint verification, to authenticate an identity and permission of the user, and recognize a control instruction corresponding to the voice instruction. In step S506, when the verification succeeds, the control instruction corresponding to the voice instruction is executed.

What is claimed is:

1. A human-machine interaction method, comprising:
    obtaining motion track information of a mobile terminal, wherein the motion track information is obtained by using a motion sensor of the mobile terminal;
    in response to determining that a predefined operation is performed on the mobile terminal, obtaining first gesture action information of a user, wherein the first gesture action information is obtained by using an optical sensor of an object device that interacts with the user, wherein the first gesture action information comprises gesture action form information and gesture action time information, and the motion track information comprises motion track form information and motion track time information;
    determining whether a similarity of a first form of a motion of the mobile and a second form of a gesture exists by processing the gesture action form information and the motion track form information using a machine learning model;
    determining whether a consistency between a first time of the motion of the mobile and a second time of the gesture by comparing a preset threshold with a difference between the gesture action form information and the motion track time information;
    determining that the first gesture action information matches the motion track information in response to determining that the similarity exists and the consistency exists; and
    executing first control when the first gesture action information matches the motion track information, wherein the first control comprises control executed according to a control instruction corresponding to the first gesture action information.

2. The human-machine interaction method according to claim 1, further comprising:
    recognizing, by using the optical sensor, the user corresponding to the first gesture action information; and
    when the first gesture action information matches the motion track information, authenticating the user corresponding to the first gesture action information as a valid user.

3. The human-machine interaction method according to claim 2, further comprising:
    obtaining second gesture action information of the valid user by using the optical sensor, wherein the second gesture action information is later than the first gesture action information in terms of time, and the first control comprises control executed according to a control instruction corresponding to the second gesture action information.

4. The human-machine interaction method according to claim 2, wherein
the object device is a vehicle, the vehicle comprises a display, and the first control comprises displaying, on the display, an environment image comprising the valid user, wherein the valid user is highlighted in the environment image.

5. The human-machine interaction method according to claim 2, wherein
the object device is a vehicle, and the first control comprises enabling the vehicle to move autonomously toward the valid user.

6. The human-machine interaction method according to claim 1, wherein
the obtaining first gesture action information comprises:
obtaining location information of the mobile terminal from the mobile terminal; and
adjusting the optical sensor based on the location information to include the mobile terminal within a detection range of the optical sensor.

7. The human-machine interaction method according to claim 1, wherein
the obtaining first gesture action information comprises:
when the motion track information is obtained but the first gesture action information is not obtained within predefined time, sending, to the mobile terminal, information for requesting to perform a first gesture action.

8. The human-machine interaction method according to claim 1,
further comprising: authenticating validity of an identity (ID) of the mobile terminal, wherein
the obtaining motion track information of a mobile terminal comprises obtaining motion track information of a mobile terminal that has a valid ID.

9. A human-machine interaction apparatus, comprising:
at least one processor; and
a memory coupled to the at least one processor and storing programming instructions for execution by the at least one processor, wherein the programming instructions instruct the at least one processor to perform the following operations:
obtaining motion track information of a mobile terminal, wherein the motion track information is obtained by using a motion sensor of the mobile terminal;
in response to determining that a predefined operation is performed on the mobile terminal, obtaining first gesture action information of a user, wherein the first gesture action information is obtained by using an optical sensor of an object device that interacts with the user, wherein the first gesture action information comprises gesture action form information and gesture action time information, and the motion track information comprises motion track form information and motion track time information;
determining whether a similarity of a first form of a motion of the mobile and a second form of a gesture exists by processing the gesture action form information and the motion track form information using a machine learning model;
determining whether a consistency between a first time of the motion of the mobile and a second time of the gesture by comparing a preset threshold with a difference between the gesture action form information and the motion track time information;
determining that the first gesture action information matches the motion track information in response to determining that the similarity exists and the consistency exists; and
executing first control when the first gesture action information matches the motion track information, wherein the first control comprises control executed according to a control instruction corresponding to a first gesture action.

10. The human-machine interaction apparatus according to claim 9, wherein the operations further comprise:
recognizing, by using the optical sensor, the user corresponding to the first gesture action information; and
when the first gesture action information matches the motion track information, authenticating the user corresponding to the first gesture action information as a valid user.

11. The human-machine interaction apparatus according to claim 10, wherein the operations further comprise:
obtaining second gesture action information of the valid user by using the optical sensor, wherein the second gesture action information is later than the first gesture action information in terms of time, and
the first control comprises control executed according to a control instruction corresponding to the second gesture action information.

12. The human-machine interaction apparatus according to claim 10, wherein
the object device is a vehicle, the vehicle comprises a display, and the first control comprises displaying, on the display, an environment image comprising the valid user, wherein the valid user is highlighted in the environment image.

13. The human-machine interaction apparatus according to claim 10, wherein
the object device is a vehicle, and the first control comprises enabling the vehicle to move autonomously toward the valid user.

14. The human-machine interaction apparatus according to claim 9, wherein the programming instructions instruct the at least one processor to perform the following operation:
obtaining location information of the mobile terminal from the mobile terminal; and
adjusting the optical sensor based on the location information to include the mobile terminal within a detection range of the optical sensor.

15. The human-machine interaction apparatus according to claim 9, wherein
when the motion track information is obtained but the first gesture action information is not obtained within predefined time, information for requesting to perform the first gesture action is sent to the mobile terminal.

16. The human-machine interaction apparatus according to claim 9, wherein the programming instructions instruct the at least one processor to perform the following operation:
authenticating validity of an identity (ID) of the mobile terminal, wherein
obtaining motion track information of a mobile terminal that has a valid ID.

17. One or more non-transitory computer-readable media containing instructions which, when executed, cause an electronic device to perform operations comprising:

obtaining motion track information of a mobile terminal, wherein the motion track information is obtained by using a motion sensor of the mobile terminal;

in response to determining that a predefined operation is performed on the mobile terminal, obtaining first gesture action information of a user, wherein the first gesture action information is obtained by using an optical sensor of an object device that interacts with the user, wherein the first gesture action information comprises gesture action form information and gesture action time information, and the motion track information comprises motion track form information and motion track time information;

determining whether a similarity of a first form of a motion of the mobile and a second form of a gesture exists by processing the gesture action form information and the motion track form information using a machine learning model;

determining whether a consistency between a first time of the motion of the mobile and a second time of the gesture by comparing a preset threshold with a difference between the gesture action form information and the motion track time information;

determining that the first gesture action information matches the motion track information in response to determining that the similarity exists and the consistency exists; and executing first control when the first gesture action information matches the motion track information, wherein the first control comprises control executed according to a control instruction corresponding to the first gesture action information.

18. The one or more non-transitory computer-readable media according to claim 17, wherein the operations further comprise:

recognizing the user corresponding to the first gesture action information; and when the first gesture action information matches the motion track information, authenticating the user corresponding to the first gesture action information as a valid user.

19. The one or more non-transitory computer-readable media according to claim 18, wherein the operations further comprise:

obtaining second gesture action information of the valid user by using the optical sensor, wherein the second gesture action information is later than the first gesture action information in terms of time, and the first control comprises control executed according to a control instruction corresponding to the second gesture action information.

20. The one or more non-transitory computer-readable media according to claim 18, wherein the object device is a vehicle, the vehicle comprises a display, and the first control comprises displaying, on the display, an environment image comprising the valid user, wherein the valid user is highlighted in the environment image.

* * * * *